United States Patent
Morita et al.

(10) Patent No.: US 11,923,546 B2
(45) Date of Patent: *Mar. 5, 2024

(54) CARBON NANOTUBE DISPERSION AND USE THEREOF

(71) Applicants: TOYO INK SC HOLDINGS CO., LTD., Tokyo (JP); TOYOCOLOR CO., LTD., Tokyo (JP)

(72) Inventors: Yu Morita, Tokyo (JP); Tomoaki Masuoka, Tokyo (JP)

(73) Assignees: TOYO INK SC HOLDINGS CO., LTD., Tokyo (JP); TOYOCOLOR CO., LTD., Tokyo (JP)

(*) Notice: Subject to any disclaimer, the term of this patent is extended or adjusted under 35 U.S.C. 154(b) by 602 days.

This patent is subject to a terminal disclaimer.

(21) Appl. No.: 17/256,224

(22) PCT Filed: Jun. 17, 2019

(86) PCT No.: PCT/JP2019/023816
§ 371 (c)(1),
(2) Date: Dec. 27, 2020

(87) PCT Pub. No.: WO2020/004095
PCT Pub. Date: Jan. 2, 2020

(65) Prior Publication Data
US 2021/0226222 A1    Jul. 22, 2021

(30) Foreign Application Priority Data

Jun. 28, 2018 (JP) ................. 2018-122748

(51) Int. Cl.
*H01M 4/62* (2006.01)
*C01B 32/174* (2017.01)
*H01M 4/13* (2010.01)
*H01M 10/0525* (2010.01)
*B82Y 30/00* (2011.01)
*B82Y 40/00* (2011.01)

(52) U.S. Cl.
CPC .......... *H01M 4/625* (2013.01); *C01B 32/174* (2017.08); *H01M 4/13* (2013.01); *H01M 10/0525* (2013.01); *B82Y 30/00* (2013.01); *B82Y 40/00* (2013.01); *C01B 2202/22* (2013.01); *C01B 2202/36* (2013.01); *C01P 2002/72* (2013.01); *C01P 2002/82* (2013.01)

(58) Field of Classification Search
None
See application file for complete search history.

(56) References Cited

U.S. PATENT DOCUMENTS

| 6,346,023 | B1 | 2/2002 | Tsuboi et al. |
|---|---|---|---|
| 8,968,604 | B2 | 3/2015 | Kitano |
| 8,992,878 | B2 | 3/2015 | Nishino et al. |
| 9,084,990 | B2 | 7/2015 | Silvy et al. |
| 10,570,016 | B2 | 2/2020 | Oda et al. |
| 2007/0224106 | A1 | 9/2007 | Sakakibara et al. |
| 2010/0119436 | A1 | 5/2010 | Takimoto et al. |
| 2013/0110317 | A1 | 5/2013 | Takemori et al. |
| 2013/0313486 | A1 | 11/2013 | Sugimori et al. |
| 2015/0111025 | A1 | 4/2015 | Nishino et al. |
| 2017/0313586 | A1 | 11/2017 | Oda et al. |

FOREIGN PATENT DOCUMENTS

| CN | 101668700 | 3/2010 |
|---|---|---|
| CN | 102341345 | 2/2012 |
| CN | 107074546 | 8/2017 |
| JP | 2000086219 | 3/2000 |
| JP | 2005162877 | 6/2005 |
| JP | 2006309958 | 11/2006 |
| JP | 2008230947 | 10/2008 |
| JP | 2008285368 | 11/2008 |
| JP | 2009176721 | 8/2009 |
| JP | 2010254546 | 11/2010 |
| JP | 2011070908 | 4/2011 |
| JP | 2011076948 | 4/2011 |
| JP | 2013230951 | 11/2013 |
| JP | 2014019619 | 2/2014 |
| JP | 2015150515 | 8/2015 |
| JP | 2016147804 | 8/2016 |
| JP | 2017206413 | 11/2017 |
| JP | 2019005721 | 1/2019 |

(Continued)

OTHER PUBLICATIONS

"International Search Report (Form PCT/ISA/210) of PCT/JP2019/023816," dated Aug. 6, 2019, with English translation thereof, pp. 1-4.
"Office Action of Japan Counterpart Application", dated Apr. 16, 2019, with English translation thereof, p. 1-p. 8.
"Office Action of Korea Counterpart Application", dated Sep. 27, 2022, p. 1-p. 3.
Office Action of China Counterpart Application, with English translation thereof, dated Jan. 10, 2023, pp. 1-14.
Tae Hyeong Kim et al., "Facile Fabrication of Carbon Nanotubes@CuO Composites by Microwave Method", Elastomers and Composites, with English abstract, Sep. 30, 2021, pp. 113-116.

(Continued)

*Primary Examiner* — Carlos Barcena
(74) *Attorney, Agent, or Firm* — JCIPRNET

(57) ABSTRACT

A carbon nanotube dispersion including a carbon nanotube, a solvent, and a dispersant. A highly conductive electrode membrane can be produced as a result of the carbon nanotube using a carbon nanotube dispersion satisfying (1), (2), and (3). (1) An average outer diameter is more than 3 nm and less than 10 nm. (2) A peak is present in a powder X-ray diffraction analysis at a diffraction angle of $2\theta=25°\pm2°$, and a half value width of the peak is 3° to 6°. (3) When a maximum peak intensity within the range of 1,560 to 1,600 $cm^{-1}$ in a Raman spectrum is G and a maximum peak intensity within the range of 1,310 to 1,350 $cm^{-1}$ is D, a G/D ratio is 0.5 to 4.5.

20 Claims, 5 Drawing Sheets

(56) References Cited

FOREIGN PATENT DOCUMENTS

| | | |
|---|---|---|
| KR | 20150028780 | 3/2015 |
| KR | 102528285 | 5/2023 |
| KR | 102545011 | 6/2023 |
| WO | 2008126534 | 10/2008 |
| WO | 2012011459 | 1/2012 |
| WO | 2016076393 | 5/2016 |
| WO | 2018168833 | 9/2018 |

OTHER PUBLICATIONS

"Patent Revocation of Korea Counterpart Application", Patent No. 102545011, dated Oct. 4, 2023, p. 1-p. 20.

"Patent Revocation of Korea Counterpart Application", Patent No. 102528285, dated Oct. 13, 2023, p. 1-p. 22.

CARBON NANOTUBE DISPERSION AND USE THEREOF

CROSS-REFERENCE TO RELATED APPLICATION

This application is a 371 application of the International PCT application serial no. PCT/JP2019/023816, filed on Jun. 17, 2019, which claims the priority benefit of Japan Patent Application No. 2018-122748, filed on Jun. 28, 2018. The entirety of each of the 10 above-mentioned patent applications is hereby incorporated by reference herein and made a part of this specification.

TECHNICAL FIELD

The present invention relates to a carbon nanotube dispersion. More specifically, the present invention relates to a resin composition containing the carbon nanotube dispersion and a resin, a composite material slurry containing the carbon nanotube dispersion, the resin, and an active material, and an electrode membrane coated with the composite material slurry.

DESCRIPTION OF RELATED ART

In recent years, lithium ion batteries have been attracting attention with the spread of mobile phones and laptop personal computers or the like. A lithium ion battery generally includes a negative electrode made of a carbon-based material, a positive electrode containing an active material into which lithium ions are reversibly occluded and released, and a non-aqueous electrolyte in which these are immersed, and the positive electrode is manufactured by applying an electrode paste consisting of an active material and a conductive material, and a binder onto a current collector plate.

In the positive electrode, the electrical conductivity of the active material is enhanced by incorporation of a conductive material, but when dispersion of the conductive material with respect to the active material is insufficient, improvement of electrical conductivity is insufficient. Accordingly, a slurry for forming an electrode of a lithium ion battery, which contains an electrode active material, a conductive material, a binder, and a polar solvent, and has an average particle size of 500 nm or less when the conductive material is dispersed has been proposed (refer to Patent Literature 1).

As the conductive material, carbon black, Ketjen black, fullerenes, graphenes, fine carbon materials, and the like are used. In particular, carbon nanotubes, which are a type of fine carbon fibers, are tubular carbon with a diameter of 1 μm or less, and their use as conductive materials for lithium ion batteries has been studied because of their high electrical conductivity based on their unique structure (refer to Patent Literature 2, Patent Literature 3, and Patent Literature 4). Among them, multi-walled carbon nanotubes having an outer diameter of 10 nm to several tens of nm are relatively inexpensive, and thus it is expected that they will be put into practical use.

When carbon nanotubes having a small average outer diameter are used, a conductive network can be efficiently formed with a small amount of carbon nanotubes, and thereby it is possible to reduce an amount of conductive material contained in a positive electrode and a negative electrode for a lithium ion battery. However, because carbon nanotubes having a small average outer diameter have strong cohesive force, which makes it difficult to disperse them, it has not yet been possible to obtain a carbon nanotube dispersion having sufficient dispersibility.

Accordingly, various attempts have been made to improve the dispersibility of carbon nanotubes with respect to a dispersion medium. For example, a method of dispersing carbon nanotubes in acetone while irradiating the carbon nanotubes with ultrasonic waves has been proposed (refer to Patent Literature 5). However, there is a problem that although carbon nanotubes can be dispersed while being irradiated with ultrasonic waves, when the irradiation is completed, the carbon nanotubes start to aggregate, and the carbon nanotubes aggregate further when a concentration of the carbon nanotubes increases.

In addition, a method of dispersing and stabilizing carbon nanotubes using various dispersants has been proposed. For example, dispersion in water and N-methyl-2-pyrrolidone (hereinafter, NMP) using a polymer-based dispersant such as the water-soluble polymer polyvinylpyrrolidone (hereinafter, PVP) has been proposed (refer to Patent Literature 2, Patent Literature 3, and Patent Literature 6). However, in Patent Literature 2, when an electrode produced using carbon nanotubes having an outer diameter of 10 to 15 nm was evaluated, there was a problem of high electrode resistance. Furthermore, in Patent Literature 3, a dispersion formed of carbon nanotubes in which an oil absorption capacity for dibutyl phthalate (hereinafter, DBP) is small has been proposed, but there is a problem in which it is difficult to obtain high electrical conductivity although dispersibility has been improved. In Patent Literature 6, examination of dispersion using single-walled CNTs having a small outer diameter has been conducted, but it was difficult to disperse carbon nanotubes in a solvent at a high concentration. Furthermore, in Patent Literature 7, carbon nanotubes in which a 2θ peak appeared at 24°±2° when powder X-ray diffraction analysis was performed, and a half value width of the peak was 6.27° have been studied, but these carbon nanotubes are a mixed composition of a single-walled carbon nanotube and a double-walled carbon nanotube, and therefore it was necessary to perform a dispersion treatment using an ultrasound homogenizer. Accordingly, obtaining a carbon nanotube dispersion in which carbon nanotubes having a small outer diameter have been dispersed in a dispersion medium at a high concentration and uniformly has been an important issue for expanding usage applications.

REFERENCE LIST

Patent Literature

Patent Literature 1: Japanese Patent Laid-Open No. 2006-309958
Patent Literature 2: Japanese Patent Laid-Open No. 2011-70908
Patent Literature 3: Japanese Patent Laid-Open No. 2014-19619
Patent Literature 4: Japanese Patent Laid-Open No. 2008-285368
Patent Literature 5: Japanese Patent Laid-Open No. 2000-86219
Patent Literature 6: Japanese Patent Laid-Open No. 2005-162877
Patent Literature 7: Japanese Patent Laid-Open No. 2008-230947

SUMMARY

Technical Problem

An objective to be achieved by the present invention is to solve the above-mentioned conventional problems, and to provide a carbon nanotube dispersion formed of carbon nanotubes having a small average outer diameter.

Another objective to be achieved by the present invention is to provide a carbon nanotube dispersion and a carbon nanotube resin composition, which are used for obtaining an electrode membrane having high electrical conductivity.

Solution to Problem

The inventors of the present invention have diligently studied to achieve the above-mentioned objectives. The inventors of the present invention have found that it is possible to produce a carbon nanotube dispersion having excellent electrical conductivity by using carbon nanotubes in which an average outer diameter is more than 3 nm and less than 10 nm, a peak appears at a diffraction angle $2\theta=25°\pm2°$ in powder X-ray diffraction analysis, and a half value width of the peak is 3° to 6°. The inventors of the present invention have completed the present invention based on such a finding.

That is, one embodiment of the present invention relates to a carbon nanotube dispersion including: a carbon nanotube; a solvent; and a dispersant, in which the carbon nanotube satisfies the following (1), (2), and (3):

(1) an average outer diameter is more than 3 nm and less than 10 nm,
(2) a peak appears at a diffraction angle $2\theta=25°\pm2°$ in powder X-ray diffraction analysis, and a half value width of the peak is 3° to 6°, and
(3) a G/D ratio is 0.5 to 4.5, where G represents a maximum peak intensity in a range of 1,560 to 1,600 $cm^{-1}$, and D represents a maximum peak intensity in a range of 1,310 to 1,350 $cm^{-1}$ in a Raman spectrum.

In addition, another embodiment of the present invention relates to a carbon nanotube resin composition including the carbon nanotube dispersion and a binder.

In addition, still another embodiment of the present invention relates to a composite material slurry including the carbon nanotube resin composition and an active material.

In addition, still another embodiment of the present invention relates to an electrode membrane which is coated with the composite material slurry.

Effects of Invention

By using the carbon nanotube dispersion of the embodiment of the present invention, it is possible to produce a resin composition, a composite material slurry, and an electrode membrane which have excellent electrical conductivity. Accordingly, it is possible to use the carbon nanotube dispersion of the embodiment of the present invention in various usage application fields in which high electrical conductivity is required.

DESCRIPTION OF THE EMBODIMENTS

Figure 1:
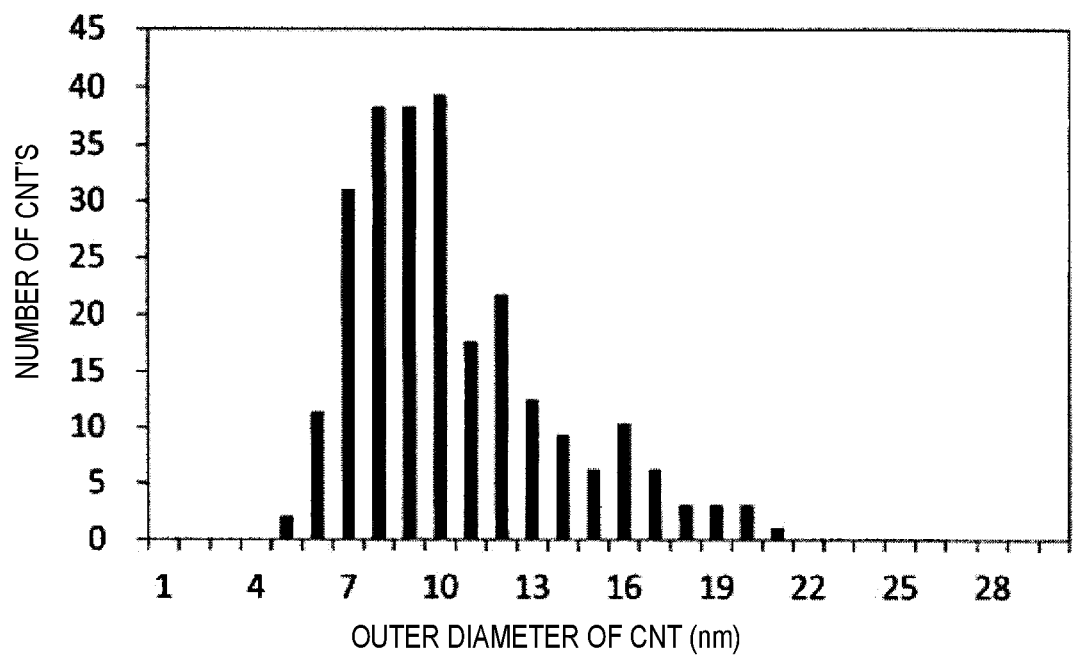
FIG. 1 is a graph showing a relationship between an outer diameter and the number of carbon nanotubes used in Example 1 when 300 arbitrary carbon nanotubes were observed using a transmission electron microscope.

Hereinafter, a carbon nanotube dispersion, a resin composition, a composite material slurry, and an electrode membrane coated with the composite material slurry of the present embodiment will be described in detail.

Embodiments of the present invention are as follows.

[1] A carbon nanotube dispersion including: a carbon nanotube; a solvent; and a dispersant, in which the carbon nanotube satisfies the following (1), (2), and (3):
  (1) an average outer diameter is more than 3 nm and less than 10 nm,
  (2) a peak appears at a diffraction angle $2\theta=25°\pm2°$ in powder X-ray diffraction analysis, and a half value width of the peak is 3° to 6°, and
  (3) a G/D ratio is 0.5 to 4.5, where G represents a maximum peak intensity in a range of 1,560 to 1,600 $cm^{-1}$, and D represents a maximum peak intensity in a range of 1,310 to 1,350 $cm^{-1}$ in a Raman spectrum.

[2] The carbon nanotube dispersion according to [1], in which a standard deviation of an outer diameter of the carbon nanotube is more than 0.7 nm and equal to or less than 3.5 nm.

[3] The carbon nanotube dispersion according to [1] or [2], in which a volume resistivity of the carbon nanotube is $1.0\times10^{-2}$ to $2.5\times10^{-2}$ $\Omega \cdot cm$.

[4] The carbon nanotube dispersion according to any one of [1] to [3], in which the G/D ratio is 1.0 to 3.0.

[5] The carbon nanotube dispersion according to any one of [1] to [4], in which the solvent is an amide-based organic solvent or water.

[6] The carbon nanotube dispersion according to any one of [1] to [5], in which $5.0 \text{ nm} \leq X \pm \sigma \leq 14.0 \text{ nm}$ is satisfied, where X represents the average outer diameter of the carbon nanotube, and $\sigma$ represents the standard deviation of the outer diameter of the carbon nanotube.

[7] A carbon nanotube resin composition including: the carbon nanotube dispersion according to any one of [1] to [6]; and a binder.

[8] A composite material slurry including the carbon nanotube resin composition according to [7], and an active material.

[9] An electrode membrane which is coated with the composite material slurry according to [8].

(1) Carbon Nanotube (A)

A carbon nanotube (A) of the present embodiment has a shape in which flat graphite is wound in a cylindrical shape. The carbon nanotube (A) may be a carbon nanotube into which a single-walled carbon nanotube is incorporated. Single-walled carbon nanotubes have a structure in which one layer of graphite is wound. A multi-walled carbon nanotube has a structure in which two or three or more layers of graphite are wound. Furthermore, a side wall of the carbon nanotube (A) may not have a graphite structure. For example, a carbon nanotube having a side wall having an amorphous structure can be used as the carbon nanotube (A).

A shape of the carbon nanotube (A) of the present embodiment is not limited. Examples of such shapes include various shapes including a needle shape, a cylindrical tube shape, a fish-bone shape (fishbone or cup laminated type), a playing card shape (platelet), and a coil shape. Among them, a shape of the carbon nanotube (A) is preferably a needle shape or a cylindrical tube shape in the present embodiment. The carbon nanotube (A) may have a single shape or a combination of two or more kinds of shape.

Examples of forms of the carbon nanotube (A) of the present embodiment include, but are not limited to, graphite whiskers, filamentous carbon, graphite fibers, ultrafine carbon tubes, carbon tubes, carbon fibrils, carbon microtubes, and carbon nanofibers. The carbon nanotube (A) may have a single form thereof or a combination of two or more kinds thereof.

An average outer diameter of the carbon nanotube (A) of the present embodiment is more than 3 nm and less than 10 nm, is preferably more than 4 nm and less than 10 nm, and is more preferably more than 4 nm and less than 8 nm.

A standard deviation of an outer diameter of the carbon nanotube (A) of the present embodiment is preferably more than 0.7 nm and equal to or less than 3.5 nm, is more preferably more than 1.4 nm and equal to or less than 3.5 nm, and is even more preferably more than 1.4 nm and equal to or less than 3 nm.

In the carbon nanotube (A) of the present embodiment, it is preferable that $5.0 \text{ nm} \leq X \pm \sigma \leq 14.0 \text{ nm}$ be satisfied, and it is more preferable that $5.0 \text{ nm} \leq X \pm \sigma \leq 10.0 \text{ nm}$ be satisfied, where the average outer diameter of the carbon nanotube is X [nm], and the standard deviation of the outer diameter of the carbon nanotube is $\sigma$ [nm]. Furthermore, it is preferable that $2.0 \text{ nm} \leq X \pm 2\sigma \leq 17.0 \text{ nm}$ be satisfied, it is more preferable that $3.0 \text{ nm} \leq X \pm 2\sigma \leq 13.5 \text{ nm}$ be satisfied, and it is even more preferable that $3.0 \text{ nm} \leq X \pm 2\sigma \leq 12.0 \text{ nm}$ be satisfied.

An outer diameter and an average outer diameter of the carbon nanotube (A) of the present embodiment are obtained as follows. First, the carbon nanotube (A) is observed and imaged with a transmission electron microscope. Next, arbitrary 300 carbon nanotubes (A) in an observation photograph are selected, and an outer diameter of each of the carbon nanotubes is measured. Next, an average outer diameter (nm) of the carbon nanotubes (A) is calculated as a number average outer diameter.

A fiber length of the carbon nanotube (A) of the present embodiment is preferably 0.1 to 150 μm, and more preferably 1 to 10 μm.

A carbon purity of the carbon nanotube (A) of the present embodiment is represented by a content (mass %) of carbon atoms in the carbon nanotube (A). A carbon purity is preferably 90 mass % or more, more preferably 95 mass % or more, even more preferably 99 mass % or more, and particularly preferably 99.5 mass % or more, with respect to 100 mass % of the carbon nanotube (A).

An amount of metals contained in the carbon nanotube (A) of the present embodiment is preferably less than 10 mass %, more preferably less than 5 mass %, even more preferably less than 1 mass %, and still more preferably less than 0.5 mass %, with respect to 100 mass % of the carbon nanotube (A). Examples of metals contained in the carbon nanotube (A) include a metal or metal oxide used as a catalyst in synthesizing the carbon nanotube (A). Specific examples thereof include metals such as cobalt, nickel, aluminum, magnesium, silica, manganese, and molybdenum; metal oxides; or composite oxides thereof.

The carbon nanotubes (A) of the present embodiment generally exist as secondary particles. A form of the secondary particles may be, for example, a state in which the carbon nanotube (A) which is a general primary particle is intricately intertwined. The carbon nanotubes (A) may be an aggregate of straight carbon nanotubes. A secondary particle, which is an aggregate of the straight carbon nanotubes (A), unravels more easily than those that are intertwined. Furthermore, the straight carbon nanotube has better dispersibility than the intertwined carbon nanotube, and thus can be suitably used as the carbon nanotube (A).

The carbon nanotube (A) of the present embodiment may be a carbon nanotube that has been subjected to a surface treatment. Furthermore, the carbon nanotube (A) may be a carbon nanotube derivative to which a functional group represented by a carboxyl group has been imparted. Furthermore, it is also possible to use the carbon nanotube (A) into which a substance represented by an organic compound, a metal atom, or fullerene is incorporated.

A layer structure of the carbon nanotube (A) can be analyzed by powder X-ray diffraction analysis according to the following method.

First, the carbon nanotube (A) is packed into a predetermined sample holder such that a surface is flat and set in a powder X-ray diffraction analyzer, and measurement is performed while changing an irradiation angle of an X-ray source from 15° to 35°. As the X-ray source, for example, CuKα rays can be used. The carbon nanotube (A) can be evaluated by reading a diffraction angle 2θ at which the peak appears at that time. In a case of graphite, it is known that a peak of 2θ is usually detected near 26°, and this is a peak according to interlayer diffraction. Because the carbon nanotube (A) also has a graphite structure, a peak according to graphite interlayer diffraction is detected near 26°. However, because carbon nanotubes have a cylindrical structure, values thereof are different from those having a graphite structure. It can be determined that a composition having a multilayer structure instead of a single layer is contained when a peak appears at a position at which a value 2θ is 25°±2°. Since a peak appearing at this position is a peak according to interlayer diffraction of a multilayer structure, it is possible to determine the number of layers of the carbon nanotube (A). A single-walled carbon nanotube has only one layer, and when there is only single-walled carbon nanotubes, a peak does not appear at a position of 25°±2°. However, when multi-walled carbon nanotubes or the like are mixed with single-walled carbon nanotubes, a peak may appear at a position in which 2θ is 25°±2°.

In the carbon nanotube (A) of the present embodiment, a peak appears at a position in which 2θ is 25°±2°. In addition, a layer structure can also be analyzed from a half value width of the peak at 25°±2° detected by powder X-ray diffraction analysis. That is, it is thought that as a half value width of this peak becomes smaller, the number of layers of the multi-walled carbon nanotube (A) becomes larger. On the contrary, it is thought that as a half value width of this peak becomes larger, the number of layers of the carbon nanotube becomes smaller.

The carbon nanotube (A) of the present embodiment has a peak at a diffraction angle of 2θ=25°±2° when powder X-ray diffraction analysis is performed, and a half value width of the peak is 3° to 6°, is preferably 4° to 6°, and is more preferably 5° to 6°.

A G/D ratio of the carbon nanotube (A) of the present embodiment is determined by Raman spectroscopy. In the carbon nanotube (A) of the present embodiment, a G/D ratio is 0.5 to 4.5, is preferably 0.7 to 3.0, and is more preferably 1.0 to 3.0 when G represents a maximum peak intensity in a range of 1,560 to 1,600 cm$^{-1}$, and D represents a maximum peak intensity in a range of 1,310 to 1,350 cm$^{-1}$ in a Raman spectrum.

There are various laser wavelengths used in Raman spectroscopy, but in the present specification, 532 nm and 632 nm are used. A Raman shift observed near 1,590 cm$^{-1}$ in the Raman spectrum is called a G band derived from graphite, and a Raman shift observed near 1,350 cm$^{-1}$ is called a D band derived from a defect of amorphous carbon or graphite. As a G/D ratio of the carbon nanotube becomes higher, a degree of graphitization becomes higher.

Because the wave number of Raman spectroscopy may fluctuate depending on measurement conditions, the wave number defined herein shall be defined by the wave number±10 cm$^{-1}$.

A volume resistivity of the carbon nanotube (A) of the present embodiment is preferably $1.0 \times 10^{-2}$ to $2.5 \times 10^{-2}$ Ω·cm, is more preferably $1.0 \times 10^{-2}$ to $2.0 \times 10^{-2}$ Ω·cm, and is even more preferably $1.2 \times 10^{-2}$ to $1.8 \times 10^{-2}$ Ω·cm. A volume resistivity of the carbon nanotube (A) can be measured using a powder resistivity measuring device (Loresta GP powder resistivity measuring system MCP-PD-51 manufactured by Mitsubishi Chemical Analytech Co., Ltd.).

A Brunauer-Emmett-Teller (BET) specific surface area of the carbon nanotube (A) of the present embodiment is preferably 200 to 1,000 m$^2$/g, more preferably 300 to 900 m$^2$/g, and even more preferably 400 to 800 m$^2$/g.

The carbon nanotube (A) of the present embodiment is not particularly limited, and a carbon nanotube manufactured by any method may be used as long as an average outer diameter is more than 3 nm and less than 10 nm, a peak appears at a diffraction angle of 2θ=25°±2° in powder X-ray diffraction analysis, a half value width of the peak is 3° to 6°, and a G/D ratio is 0.5 to 3.0 when G represents a maximum peak intensity in a range of 1,560 to 1,600 cm$^{-1}$, and D represents a maximum peak intensity in a range of 1,310 to 1,350 cm$^{-1}$ in a Raman spectrum. For example, the carbon nanotube (A) can be produced by a laser ablation method, an arc discharge method, a thermal chemical vapor deposition (CVD) method, a plasma CVD method, and a combustion method.

(2) Solvent (B)

A solvent (B) of the present embodiment is not particularly limited as long as the carbon nanotube (A) can be dispersed therein, but it is preferably a mixed solvent composed of water and any one or two or more kinds of water-soluble organic solvent.

As the water-soluble organic solvent, it is possible to use a water-soluble organic solvent including alcohols (methanol, ethanol, propanol, isopropanol, butanol, isobutanol, secondary butanol, tertiary butanol, benzyl alcohol, and the like), polyhydric alcohols (ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol, and the like), polyhydric alcohol ethers (ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monomethyl ether, propylene glycol monoethyl ether, propylene glycol monobutyl ether, ethylene glycol monomethyl ether acetate, triethylene glycol monomethyl ether, triethylene glycol monoethyl ether, triethylene glycol monobutyl ether, ethylene glycol monophenyl ether, propylene glycol monophenyl ether, and the like), amines (ethanolamine, diethanolamine, triethanolamine, N-methyldiethanolainine, N-ethyldiethanolamine, morpholine, N-ethylmorpholine, ethylenediamine, diethylenediamine, triethylenetetramine, tetraethylenepentamine, polyethyleneimine, pentamethyldiethylenetriamine, tetramethylpropylenediamine, and the like), amides (N-methyl-2-pyrrolidone (NMP), N-ethyl-2-pyrrolidone (NEP), N,N-dimethylformamide, N,N-dimethylacetamide, N,N-diethylacetamide, N-methylcaprolactam, and the like), heterocyclic rings (cyclohexyrrolidone, 2-oxazolidone, 1,3-dimethyl-2-imidazolidinone, 7-butyrolactone, and the like), sulfoxides (dimethyl sulfoxide and the like), sulfones (hexamethylphosphorotriamides, sulfolanes, and the like), lower ketones (acetone, methyl ethyl ketone, and the like), tetrahydrofuran, urea, acetonitrile, and the like. Among them, water or an amide-based organic solvent is more preferable, and N-methyl-2-pyrrolidone and N-ethyl-2-pyrrolidone are particularly preferable among the amide-based organic solvents.

When only an amide-based organic solvent is used as the solvent (B) of the present embodiment, a water content in the solvent (B) is preferably 500 ppm or less, more preferably 300 ppm or less, and even more preferably 100 ppm or less.

(3) Dispersant (C)

A dispersant (C) of the present embodiment is not particularly limited as long as the carbon nanotube (A) can be dispersed and stabilized, and it is possible to use a surfactant or a resin-type dispersant. Surfactants are mainly classified into anionic, cationic, nonionic, and amphoteric. Appropriately suitable types of dispersants can be used in appropriate formulation amounts according to characteristics required for dispersion of the carbon nanotube (A).

When selecting an anionic surfactant, the type thereof is not particularly limited. Specific examples thereof include, but are not limited to, fatty acid salts, polysulfonates, polycarboxylates, alkyl sulfates, alkylaryl sulfonates, alkylnaphthalene sulfonates, dialkyl sulfonates, dialkyl sulfosuccinates, alkyl phosphates, polyoxyethylene alkyl ether sulfates, polyoxyethylene alkyl aryl ether sulfates, naphthalene sulfonic acid formalin condensate, polyoxyethylene alkyl phosphate sulfonates, glycerol borate fatty acid esters, and polyoxyethylene glycerol fatty acid esters. Specific examples thereof further include, but are not limited to, sodium dodecylbenzene sulfonate, sodium lauryl sulfate, sodium polyoxyethylene lauryl ether sulfate, polyoxyethylene nonylphenyl ether sulfate, and sodium salts of a β-naphthalene sulfonic acid formalin condensate.

Furthermore, as a cationic surfactant, there are alkylamine salts and quaternary ammonium salts. Specific examples thereof include, but are not limited to, stearylamine acetate, trimethyl palm ammonium chloride, trimethyl beef tallow ammonium chloride, dimethyldioleyl ammonium chloride, methyloleyl diethanol chloride, tetramethylammonium chloride, laurylpyridinium chloride, laurylpyridinium bromide, lauryl pyridinium Bisulfate, cetylpyridinium bromide, 4-alkyl mercaptopyridine, poly(vinyl pyridine)-dodecyl bromide, and dodecylbenzyl triethylammonium chloride. Furthermore, examples of amphoteric surfactants include, but are not limited to, aminocarboxylic acid salts.

Furthermore, examples of nonionic surfactants include, but are not limited to, polyoxyethylene alkyl ethers, polyoxyalkylene derivatives, polyoxyethylene phenyl ethers, sorbitan fatty acid esters, polyoxyethylene sorbitan fatty acid esters, and alkylallyl ethers. Specific examples thereof include, but are not limited to, polyoxyethylene lauryl ether, sorbitan fatty acid ester, and polyoxyethylene octylphenyl ether.

A surfactant selected is not limited to a single surfactant. Therefore, it is possible to use two or more kinds of surfactants in combination. For example, a combination of an anionic surfactant and a nonionic surfactant, or a combination of a cationic surfactant and a nonionic surfactant can be used. In this case, a formulation amount is preferably a suitable formulation amount for each surfactant component. As a combination, a combination of an anionic surfactant and a nonionic surfactant is preferable. The anionic surfactant is preferably a polycarboxylic acid salt. The nonionic surfactant is preferably polyoxyethylene phenyl ether.

In addition, specific examples of resin-type dispersants include cellulose derivatives (cellulose acetate, cellulose acetate butyrate, cellulose butyrate, cyanoethyl cellulose, ethyl hydroxyethyl cellulose, nitrocellulose, methylcellulose, ethylcellulose, hydroxyethylcellulose, hydroxypropylcellulose, hydroxypropylmethylcellulose, and the like), polyvinyl alcohol, polyvinyl butyral, and polyvinylpyrrolidone. Methyl cellulose, ethyl cellulose, polyvinyl alcohol, polyvinyl butyral, and polyvinylpyrrolidone are particularly preferable.

(4) Carbon Nanotube Dispersion

The carbon nanotube dispersion of the present embodiment contains the carbon nanotube (A), the solvent (B), and the dispersant (C).

In order to produce the carbon nanotube dispersion of the present embodiment, it is preferable to carry out a treatment of dispersing the carbon nanotube (A) in the solvent (B). A dispersion apparatus used to perform such a treatment is not particularly limited.

As the dispersion apparatus, a disperser usually used for pigment dispersion or the like can be used. Examples thereof include, but are not limited to mixers such as dispersion mixers, homo mixers, and planetary mixers; homogenizers (Advanced Digital Sonifer (registered trademark) manufactured by BRANSON, MODEL 450DA, "Clearmix" manufactured by M Technique, "Filmix" manufactured by PRIMIX, and "Abramix" manufactured by Silverson); paint conditioners (manufactured by Red Devil); colloid mills ("PUC colloid mill" manufactured by PUC, and "Colloid mill MK" manufactured by IKA); cone mills ("Cone mill MKO" manufactured by IKA, and the like); ball mills; sand mills ("Dyno mill" manufactured by Shinmaru Enterprises, and the like); attritors; pearl mills ("DCP mill" manufactured by Eirich and the like); media type dispersers such as a coball mill; wet-type jet mills ("Genus PY" manufactured by Genus, "Starburst" manufactured by Sugino Machine, "Nanomizer" manufactured by Nanomizer, and the like); medialess dispersers such as "Clear SS-5" manufactured by M-Technique and "MICROS" manufactured by Nara Machinery Co., Ltd; other roll mills; and the like.

An amount of solid contents of the carbon nanotube dispersion of the present embodiment is preferably 0.1 to 30 mass %, more preferably 0.5 to 25 mass %, even more preferably 1 to 10 mass %, and particularly preferably 1 to 5 mass % with respect to 100 mass % of the carbon nanotube dispersion.

An amount of the dispersant (C) to be used in the carbon nanotube dispersion of the present embodiment is preferably 3 to 300 mass % with respect to 100 mass % of the carbon nanotube (A). Furthermore, from the viewpoint of electrical conductivity, it is preferable to use 5 to 100 mass %, it is more preferable to use 5 to 50 mass %, and it is even more preferable to use 5 to 25 mass %.

A fiber length of the carbon nanotube (A) in the carbon nanotube dispersion of the present embodiment is preferably 0.1 to 10 μm, more preferably 0.2 to 5 μm, and even more preferably 0.3 to 2 μm.

(5) Binder (D)

A binder (D) is a resin that bonds substances to each other.

Examples of the binder (D) of the present embodiment include polymers or copolymers containing, as a constituent unit, ethylene, propylene, vinyl chloride, vinyl acetate, vinyl alcohol, maleic acid, acrylic acid, acrylic acid ester, methacrylic acid, methacrylic acid ester, acrylonitrile, styrene, vinyl butyral, vinyl acetal, vinylpyrrolidone, and the like; polyurethane resin, polyester resin, phenol resin, epoxy resin, phenoxy resin, urea resin, melamine resin, alkyd resin, acrylic resin, formaldehyde resin, silicone resin, fluororesin; cellulose resins such as carboxymethyl cellulose; rubbers such as styrene-butadiene rubber and fluororubber; conductive resins such as polyaniline and polyacetylene; and the like. Furthermore, modified products, mixtures, and copolymers of these resins may be used. In particular, from the viewpoint of resistance, it is preferable to use a polymer compound having a fluorine atom in a molecule, such as polyvinylidene fluoride, polyvinyl fluoride, and tetrafluoroethylene.

A weight-average molecular weight of these resins as the binder (D) of the present embodiment is preferably 10,000 to 2,000,000, more preferably 100,000 to 1,000,000, and even more preferably 200,000 to 1,000,000. When a molecular weight is small, resistance and adhesiveness of the binder may decrease. When a molecular weight is large, resistance and adhesiveness of the binder are improved, but a viscosity of the binder itself is increased, and this lowers workability. Thereby, the binder acts as a flocculant and dispersed particles may noticeably aggregate.

From industrial applicability assumed by the embodiment of the present invention, the binder (D) preferably contains a polymer compound having a fluorine atom, and the binder is more preferably a polymer compound having a fluorine atom, is even more preferably a vinylidene fluoride-based copolymer, and is particularly preferably polyvinylidene fluoride.

(6) Carbon Nanotube Resin Composition

The carbon nanotube resin composition of the present embodiment contains the carbon nanotube (A), the solvent (B), the dispersant (C), and the binder (D).

In order to produce the carbon nanotube resin composition of the present embodiment, it is preferable to mix and homogenize the carbon nanotube dispersion (C) and the binder (D). As a mixing method, various conventionally known methods can be used. The carbon nanotube resin composition can be produced by using the dispersion apparatuses described for the carbon nanotube dispersion.

(7) Active Material (E)

An active material is a material that is the basis of a battery reaction. Active materials are divided into a positive electrode active material and a negative electrode active material according to an electromotive force.

A positive electrode active material is not particularly limited, but it is possible to use a metal oxide capable of doping or intercalating lithium ions, a metal compound such as a metal sulfide, a conductive polymer, and the like. Examples thereof include oxides of transition metals such as Fe, Co, Ni, and Mn, composite oxides with lithium, inorganic compounds such as transition metal sulfides, and the like. Specific examples thereof include transition metal oxide powders such as MnO, $V_2O_5$, $V_6O_{13}$, and $TiO_2$; composite oxide powders of transition metals and lithium such as layer-structured lithium nickel oxide, lithium cobalt oxide, and lithium manganate, or spinel-structured lithium manganate; a lithium iron phosphate material, which is a phosphoric acid compound with an olivine structure; transition metal sulfide powders such as $TiS_2$ and FeS; and the like. Furthermore, conductive polymers such as polyaniline, polyacetylene, polypyrrole, and polythiophene can also be used. Furthermore, the above-mentioned inorganic compounds and organic compounds may be mixed in and used.

A negative electrode active material is not particularly limited as long as it can dope or intercalate lithium ions. Examples thereof include negative electrode active materials made from Li, alloys such as tin alloys that are alloys of Li, silicon alloys, and lead alloys; metal oxides such as $Li_xFe_2O_3$, $Li_xFe_3O_4$, $Li_xWO_2$ (0<x<1 respectively), lithium titanate, lithium vanadium, and lithium silicon siliconate; conductive polymers such as polyacetylene and poly-p-phenylene; amorphous carbonaceous materials such as soft carbon and hard carbon; carbon-based materials such as artificial graphite such as highly graphitized carbon material, and carbonaceous powders such as natural graphite, carbon black, mesophase carbon black, resin-fired carbon materials, vapor-grown carbon fibers, and carbon fibers. These negative electrode active materials may be used alone or in combination of two or more kinds thereof.

The positive electrode active material is preferably a composite oxide with lithium containing a transition metal such as Al, Fe, Co, Ni, and Mn, is more preferably a composite oxide with lithium containing any one of Al, Co, Ni, and Mn, and is even more preferably a composite oxide with lithium containing Ni and/or Mn. When these active materials are used, particularly favorable effects can be obtained.

A BET specific surface area of the active material is preferably 0.1 to 10 $m^2/g$, more preferably 0.2 to 5 $m^2/g$, and even more preferably 0.3 to 3 $m^2/g$.

An average particle size of the active material is preferably in a range of 0.05 to 100 μm, and more preferably in a range of 0.1 to 50 μm. An average particle size of the active material as used in the present specification and the like is an average value of particle sizes of the active material which are measured with an electron microscope.

(8) Composite Material Slurry

The composite material slurry of the present embodiment contains the carbon nanotube (A), the solvent (B), the dispersant (C), the binder (D), and the active material (E).

In order to produce the composite material slurry of the present embodiment, it is preferable to add an active material to the carbon nanotube resin composition and then perform a treatment of dispersing it. A dispersion apparatus used to perform such a treatment is not particularly limited. As the composite material slurry, the composite material slurry can be produced by using the dispersion apparatus described in the carbon nanotube dispersion.

An amount of the active material (E) in the composite material slurry is preferably 20 to 85 mass %, and more preferably 40 to 85 mass %, with respect to 100 mass % of the composite material slurry.

An amount of the carbon nanotube (A) in the composite material slurry is preferably 0.05 to 10 mass %, more preferably 0.1 to 5 mass %, and even more preferably 0.1 to 3 mass % with respect to 100 mass % of the active material.

An amount of the binder (D) in the composite material slurry is preferably 0.5 to 20 mass %, more preferably 1 to 10 mass %, and even more preferably 1 to 5 mass % with respect to 100 mass % of the active material.

An amount of solid contents of the composite material slurry is preferably 30 to 90 mass % and more preferably 40 to 85 mass % with respect to 100 mass % of the composite material slurry.

A water content in the composite material slurry is preferably 500 ppm or less, more preferably 300 ppm or less, and even more preferably 100 ppm or less.

(9) Electrode Membrane

The electrode membrane of the present embodiment is a coated film in which an electrode composite material layer is formed by applying and drying the composite material slurry on a current collector.

A material and shape of the current collector used for the electrode membrane of the present embodiment are not particularly limited, and those suitable for various secondary batteries can be appropriately selected. For example, examples of materials of the current collector include metals such as aluminum, copper, nickel, titanium, and stainless steel, and alloys thereof. Furthermore, as the shape of the current collector, a flat-shaped foil is generally used, but a foil with a roughened surface, a foil with holes, and a mesh-shaped foil can also be used.

A method of applying the composite material slurry on the current collector is not particularly limited, and a known method can be used. Specific examples of application methods include a die coating method, a dip coating method, a roll coating method, a doctor coating method, a knife coating method, a spray coating method, a gravure coating method, a screen printing method, an electrostatic coating method, and the like. As a drying method, a neglected drying, a blower dryer, a warm air dryer, an infrared heater, a far infrared heater, and the like can be used, but the drying method is not particularly limited thereto.

Furthermore, after application, a rolling treatment may be performed by a lithographic press, a calendar roll, or the like. A thickness of the electrode composite material layer is generally 1 μm or more and 500 μm or less, and it is preferably 10 μm or more and 300 μm or less.

It has been found that the composite material slurry formed of the carbon nanotube dispersion as described above has favorable electrical conductivity.

The reason why electrical conductivity is favorable is because, in carbon nanotubes in which an average outer diameter is more than 3 nm and less than 10 nm, a peak appears at a diffraction angle 2θ=25°±2° in powder X-ray diffraction analysis, and a half value width of the peak is 3° to 6°, an outer diameter is smaller and a thickness of a layer is thinner than those of general carbon nanotubes, which makes it easy to form a conductive path.

The present invention relates to the subject of Japanese Patent Application No. 2018-122748 filed Jun. 28, 2018, the entire disclosure of which is incorporated herein by reference.

EXAMPLES

Hereinafter, the embodiments of the present invention will be described in more detail with reference to examples. The embodiments of the present invention are not limited to the following examples as long as the gist of the present invention is not exceeded. In the examples, "carbon nanotubes" may be abbreviated as "CNT."

<Method of Measuring Physical Properties>

Physical properties of CNTs used in each of the examples and comparative examples to be described later were measured by the following method.

<Volume Resistivity of CNT>

A powder resistivity measuring device (Loresta GP powder resistivity measuring system MCP-PD-51 manufactured by Mitsubishi Chemical Analytech Co., Ltd.) was used to prepare 1.2 g of a sample mass, and a volume resistivity [Ω·cm] of a conductive powder under various pressurization was measured at an applied voltage limiter of 90 V using a powder probe unit (four probes and ring electrodes, electrode spacing: 5.0 mm, electrode radius: 1.0 mm, sample radius: 12.5 mm). A value of the volume resistivity of the CNT at a density of 1 g/cm$^3$ was evaluated.

<Raman Spectroscopy of CNT>

The CNT was installed in a Raman microscope (XploRA, manufactured by HORIBA, Ltd.), and measurement was performed using a laser wavelength of 532 nm. Measurement conditions were as follows: a capture time: 60 seconds, an integration frequency: 2 times, a dimming filter: 10%, an objective lens magnification: 20 times, a confocus hole: 500, a slit width: 100 μm, and a measurement wavelength: 100 to 3,000 cm$^{-1}$. The CNTs for measurement were separated on a slide glass and flattened using a spatula. Among the obtained peaks, a maximum peak intensity was defined as G in the range of 1,560 to 1,600 cm$^{-1}$, and a maximum peak intensity was defined as D in the range of 1,310 to 1,350 cm$^{-1}$ in the spectrum, and a G/D ratio was used for G/D of CNT.

<Powder X-Ray Diffraction Analysis of CNT>

A CNT was placed in a central recessed part of an aluminum sample plate (outer diameter φ46 mm, thickness 3 mm, sample portion φ26.5 mm, thickness 2 mm) and flattened using a slide glass. Thereafter, a medicine wrapping paper was placed on a surface on which the sample was placed, and a load of 1 ton was applied to a surface on which the aluminum hi-sheet packing was placed to flatten the surface. Thereafter, the medicine wrapping paper and the aluminum hi-sheet packing were removed to produce a sample for powder X-ray diffraction analysis of CNT. Thereafter, the sample for powder X-ray diffraction analysis of CNT was placed in an X-ray diffractometer (Ultima 2100, manufactured by Rigaku Corporation), and the X-ray diffractometer was operated from 15° to 35° to perform analysis. Sampling was performed every 0.02°, and a scan speed was set to 2°/min. A voltage was 40 kV, a current was 40 mA, and an X-ray source was CuKα rays. 11 points of each of the plots appearing at a diffraction angle 2θ=25°±2° obtained at this time were simply moved and averaged, and a half value width of this peak was defined as a half value width of the CNT. A baseline was a line connecting plots of 2θ=16° and 2θ=34°.

<Measurement of Purity of CNT>

The CNT was acid-decomposed using a microwave sample pretreatment device (ETHOS 1 manufactured by Milestone General K.K.) to extract a metal contained in the CNT. Thereafter, analysis was performed using a multi-type ICP emission spectroscopic analyzer (720-ES, manufactured by Agilent), and an amount of metal contained in the extract was calculated. A purity of CNT was calculated as follows.

CNT purity (%)=((mass of CNT−mass of metal in CNT)/mass of CNT)×100

<Volume Resistivity of Electrode Membrane>

The composite material slurry was applied onto an aluminum foil using an applicator such that a thickness was 70±10 μm, and then the coated film was dried at 120° C.±5° C. for 25 minutes in an electric oven. Thereafter, a surface resistivity (Ω/□) of the coated film after drying was measured using Loresta GP MCP-T610 manufactured by Mitsubishi Chemical Analytech Co., Ltd. After the measurement, a thickness of the electrode composite material layer formed on the aluminum foil was multiplied to obtain a volume resistivity (Ω·cm) of the electrode membrane. A thickness of the electrode composite material layer was obtained by subtracting the thickness of the aluminum foil from an average value measured at three points in the electrode membrane using a film thickness meter (DIKIMICRO MH-15M manufactured by NIKON), and it was used for a thickness of the electrode composite material layer.

<Peeling Strength of Electrode Membrane>

The composite material slurry was applied onto an aluminum foil using an applicator such that a thickness was 70±10 μm, and then the coated film was dried at 120° C.±5° C. for 25 minutes in an electric oven. Thereafter, two pieces were cut into a rectangle of 90 mm×20 mm in a coating direction as a major axis. A desktop tensile tester (STROGRAPH E3, manufactured by Toyo Seiki Seisaku-sho, Ltd.) was used to measure peeling strength, and the peeling strength was evaluated by a 180-degree peel test method. Specifically, a double-sided tape with a size of 100 mm×30 mm (No. 5000NS, manufactured by Nitoms, Inc.) was attached onto a stainless steel plate, and the produced battery electrode composite material layer was brought into close contact with the other surface of the double-sided tape. Peeling was performed while pulling the tape from the bottom to the top at a constant speed (50 mm/min), and an average value of stress at this time was used for the peeling strength.

<Catalyst for CNT Synthesis and CNT Manufacturing Example>

CNTs used in each of the examples and comparative examples to be described later were produced by the following method.

Catalyst (A) for CNT Synthesis parts by mass of cobalt hydroxide, 138 parts by mass of magnesium acetate tetrahydrate, and 16.2 parts by mass of manganese acetate were respectively weighed out into heat-resistant containers, and drying was performed for 1 hour at a temperature of 170±5° C. using an electric oven to evaporate moisture. Thereafter, using a grinding machine (Wonder Crusher WC-3 manufactured by Osaka Chemical Co., Ltd.), a SPEED dial was adjusted to 3, and grinding was performed for 1 minute. Thereafter, using the grinding machine (Wonder Crusher WC-3 manufactured by Osaka Chemical Co., Ltd.), a SPEED dial was adjusted to 2, each of the ground powders were mixed together for 30 seconds, and thereby a catalyst precursor (A) for CNT synthesis was produced. Next, the catalyst precursor (A) for CNT synthesis was transferred to a heat-resistant container, and fired for 30 minutes in an air atmosphere at 450±5° C. using a muffle furnace (FO510 manufactured by Yamato Scientific Co., Ltd.). Thereafter, grinding was performed in a mortar, and thereby a catalyst (A) for CNT synthesis was produced.

Catalyst (B) for CNT Synthesis 60 parts by mass of cobalt hydroxide, 138 parts by mass of magnesium acetate tetrahydrate, 16.2 parts by mass of manganese carbonate, and 4.0 parts by mass of an Aerosil (AEROSIL (registered trademark) 200 manufactured by Nippon Aerosil Co., Ltd.) were respectively weighed out into heat-resistant containers, and drying was performed for 1 hour at a temperature of 170±5° C. using an electric oven to evaporate moisture. Thereafter, using a grinding machine (Wonder Crusher WC-3 manufactured by Osaka Chemical Co., Ltd.), a SPEED dial was adjusted to 3, and grinding was performed for 1 minute. Thereafter, using the grinding machine (Wonder Crusher WC-3 manufactured by Osaka Chemical Co., Ltd.), a SPEED dial was adjusted to 2, each of the ground powders were mixed together for 30 seconds, and thereby a catalyst precursor (B) for CNT synthesis was produced. Next, the catalyst precursor (B) for CNT synthesis was transferred to a heat-resistant container, and fired for 30 minutes in an air atmosphere at 450±5° C. using a muffle furnace (FO510 manufactured by Yamato Scientific Co., Ltd.). Thereafter, grinding was performed in a mortar, and thereby a catalyst (B) for CNT synthesis was produced.

Catalyst (C) for CNT Synthesis 1,000 parts by mass of magnesium acetate tetrahydrate was weighed out into a heat-resistant container, and drying was performed for 6 hours at an atmospheric temperature of 170±5° C. using an electric oven. Thereafter, using a grinding machine (Sample Mill K II W-I type, manufactured by DALTON Corporation), a 1 mm screen was attached, and grinding was performed. Thereby, a dried and ground product of magnesium acetate was produced. 45.8 parts of the dried and ground product of magnesium acetate, 8.1 parts of manganese carbonate, 1.0 part of silicon oxide ($SiO_2$, manufactured by Nippon Aerosil Co., Ltd.: AEROSIL (registered trademark) 200), and 200 parts of steel beads (bead diameter 2.0 mmφ) were put into an SM sample bottle (manufactured by Sansyo Co., Ltd.), and a grinding and mixing treatment was performed for 30 minutes using a paint conditioner manufactured by Red Devil, Inc. Thereafter, the ground and mixed powder and steel beads (bead diameter 2.0 mmφ) were separated using a stainless sieve to produce a catalyst carrier for CNT synthesis. Thereafter, 30 parts by mass of cobalt(II) hydroxide was weighed out into a heat-resistant container and dried at an atmospheric temperature of 170±5° C. for 2 hours to produce a cobalt composition containing $CoHO_2$. Thereafter, 54.9 parts by mass of the catalyst carrier for CNT synthesis and 29 parts by mass of the cobalt composition were put into the grinding machine (Wonder Crusher WC-3 manufactured by Osaka Chemical Co., Ltd.), a standard lid was attached, a SPEED dial was adjusted to 2, grinding and mixing were performed for 30 seconds, and thereby a catalyst precursor for CNT synthesis was produced. The catalyst precursor for CNT synthesis was transferred to a heat-resistant container, and fired for 30 minutes in an air atmosphere at 450±5° C. using a muffle furnace (FO510 manufactured by Yamato Scientific Co., Ltd.). Thereafter, grinding was performed in a mortar, and thereby a catalyst (C) for CNT synthesis was produced.

Catalyst (D) for CNT Synthesis

A catalyst (D) for CNT synthesis was produced by the same method as in Example 1 of Japanese Patent Laid-Open No. 2015-123410.

<Synthesis of CNT (A)>

A quartz glass heat-resistant dish onto which 2 g of the catalyst (A) for CNT synthesis had been sprayed was placed in the center portion of a horizontal reaction tube which had an internal volume of 10 L and was able to be pressurized and heated by an external heater. Exhausting thereof was performed while injecting nitrogen gas, the air in the reaction tube was replaced with nitrogen gas, and the atmosphere in the horizontal reaction tube was adjusted to have an oxygen concentration of 1% by volume or less. Next, heating was performed with an external heater until a center temperature in the horizontal reaction tube reached 680° C. After reaching 680° C., propane gas as a carbon source was introduced into the reaction tube at a flow rate of 2 L/min, and a contact reaction was carried out for 1 hour. After completion of the reaction, the gas in the reaction tube was replaced with nitrogen gas, and the temperature of the reaction tube was cooled to 100° C. or lower and then taken out to produce a CNT (A).

<Synthesis of CNT (B)>

A CNT (B) was produced by the same method as in the synthesis of the CNT (A) except that the catalyst (A) for CNT synthesis was changed to the catalyst (B) for CNT synthesis.

<Synthesis of CNT (C)>

A quartz glass heat-resistant dish onto which 1 g of the catalyst (C) for CNT synthesis had been sprayed was placed in the center portion of a horizontal reaction tube which had an internal volume of 10 L and was able to be pressurized and heated by an external heater. Exhausting thereof was performed while injecting nitrogen gas, the air in the reaction tube was replaced with nitrogen gas, and heating was performed until the atmospheric temperature in the horizontal reaction tube reached 710° C. After reaching 710° C., ethylene gas as a hydrocarbon was introduced into the reaction tube at a flow rate of 2 L/min, and a contact reaction was carried out for 7 minutes. After completion of the reaction, the gas in the reaction tube was replaced with nitrogen gas, and the temperature of the reaction tube was cooled to 100° C. or lower and then taken out to produce a CNT (C).

<Synthesis of CNT (D)>

A CNT (D) was produced by the same method as in the synthesis of the CNT (C) except that a time for the contact reaction was changed from 7 minutes to 15 minutes.

<CNT (E)>

Multi-walled carbon nanotubes (JENO TUBE 8S manufactured by JEIO Co., Ltd.) were used for a CNT (E).

<Synthesis of CNT (F)>

1,000 g of a CNT (E) was weighed out into and placed in a carbon heat-resistant container. Thereafter, the carbon heat-resistant container containing the CNT was installed in a furnace. Thereafter, the inside of the furnace was evacuated to 1 Torr (133 Pa) or less, and the carbon heater was further energized to raise the temperature inside the furnace to 1,000° C. Next, argon gas was introduced into the furnace to adjust the pressure in the furnace to 70 Torr (9.33 kPa), and then 1 L of argon gas per minute was introduced into the furnace. Thereafter, chlorine gas was introduced in addition to argon gas to adjust the pressure in the furnace to 90 Torr (11.99 kPa), and once the pressure reached 90 Torr, 0.3 L of chlorine gas per minute was introduced into the furnace. After holding this state for 1 hour, energization was stopped, introduction of argon gas and chlorine gas was also stopped, and vacuum cooling was performed. Finally, after vacuum cooling at a pressure of 1 Torr (133 Pa) or less for 12 hours, it was confirmed that the inside of the furnace had been cooled to room temperature. Thereafter, nitrogen gas was introduced into the furnace until a pressure reached atmospheric pressure, the heat-resistant container was taken out, and thereby a purified CNT (F) was produced.

<Synthesis of CNT (G)>

10 kg of the CNT (E) was weighed out into and placed in a 120 L heat-resistant container. Thereafter, the heat-resistant container containing the CNT was installed in a furnace. Thereafter, nitrogen gas was introduced into the furnace to discharge the air in the furnace while maintaining a positive pressure. After an oxygen concentration in the furnace became 0.1% or less, the furnace was heated to 1,600° C. over 30 hours. Chlorine gas was introduced at a rate of 50 L/min for 50 hours while maintaining the temperature inside the furnace at 1,600° C. Thereafter, nitrogen gas was introduced at 50 L/min and cooling was performed while maintaining a positive pressure, and thereby a CNT (G) was produced.

using a paint conditioner manufactured by Red Devil, the zirconia beads were separated off to produce a CNT dispersion (A).

(Examples 2 to 4) and (Comparative Examples 1 to 5)

CNT dispersions (B) to (D) and (H) to (K) were produced by the same method except that CNTs were changed to CNTs shown in Table 1.

Example 5

1.95 parts of the CNT (E), 0.98 parts of a dispersant (polyvinylpyrrolidone K-30 manufactured by NIPPON SHOKUBAI CO., LTD.), 127 parts of NMP, and 200 parts of zirconia beads (bead diameter 1.25 mmφ) were put in a glass bottle (M-225, manufactured by Hakuyo Glass Co., Ltd.). After performing a dispersion treatment for 10 hours using a paint conditioner manufactured by Red Devil, the zirconia beads were separated off to obtain a CNT dispersion (E).

Examples 6 and 7

Figure 2:
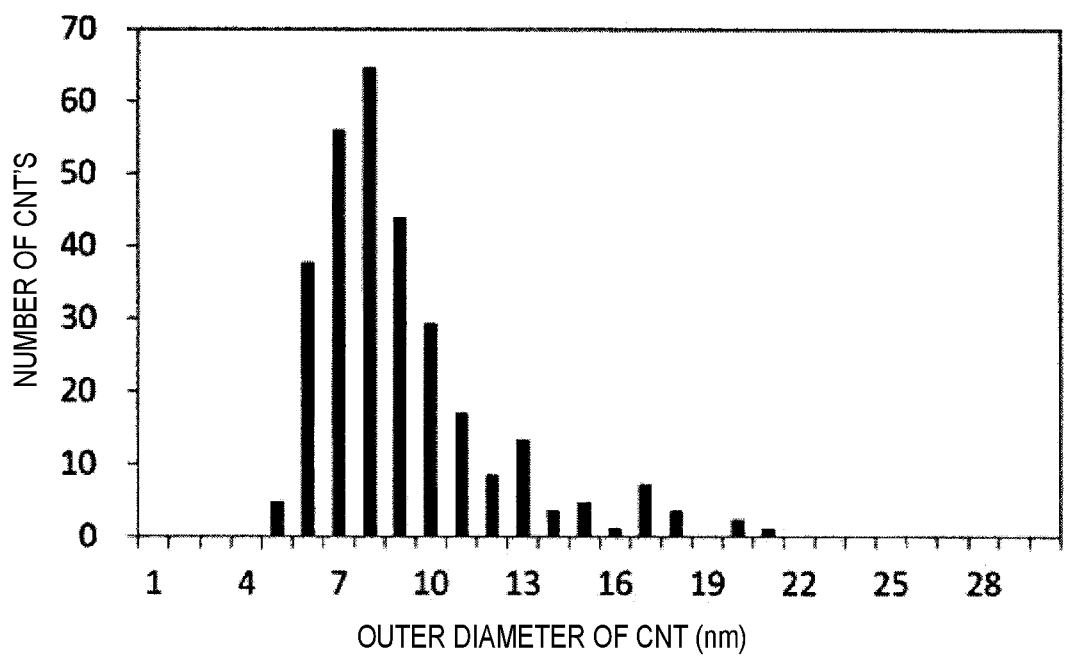
FIG. 2 is a graph showing a relationship between an outer diameter and the number of carbon nanotubes used in Example 2 when 300 arbitrary carbon nanotubes were observed using a transmission electron microscope.
Figure 3:
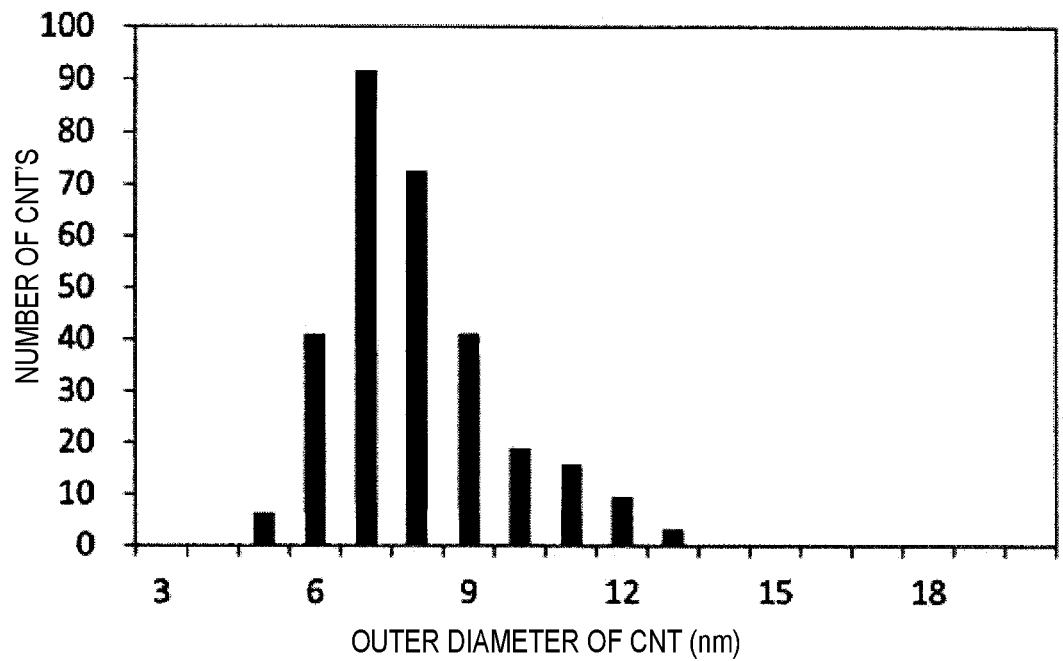
FIG. 3 is a graph showing a relationship between an outer diameter and the number of carbon nanotubes used in Example 3 when 300 arbitrary carbon nanotubes were observed using a transmission electron microscope.
Figure 4:
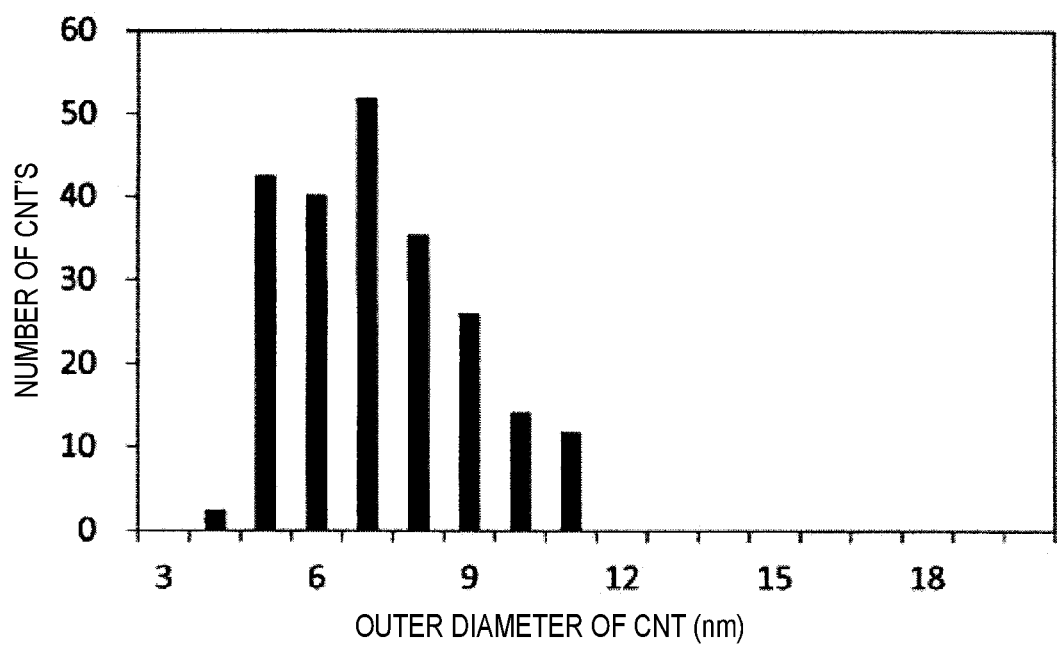
FIG. 4 is a graph showing a relationship between an outer diameter and the number of carbon nanotubes used in Example 4 when 300 arbitrary carbon nanotubes were observed using a transmission electron microscope.
Figure 5:
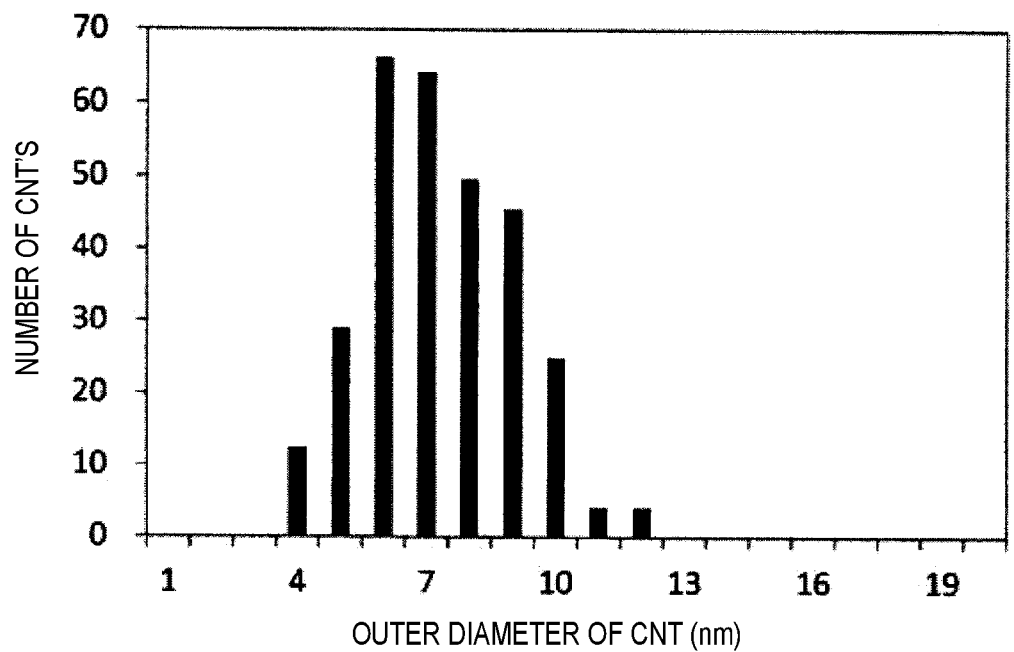
FIG. 5 is a graph showing a relationship between an outer diameter and the number of carbon nanotubes used in Example 5 when 300 arbitrary carbon nanotubes were observed using a transmission electron microscope.
Figure 6:
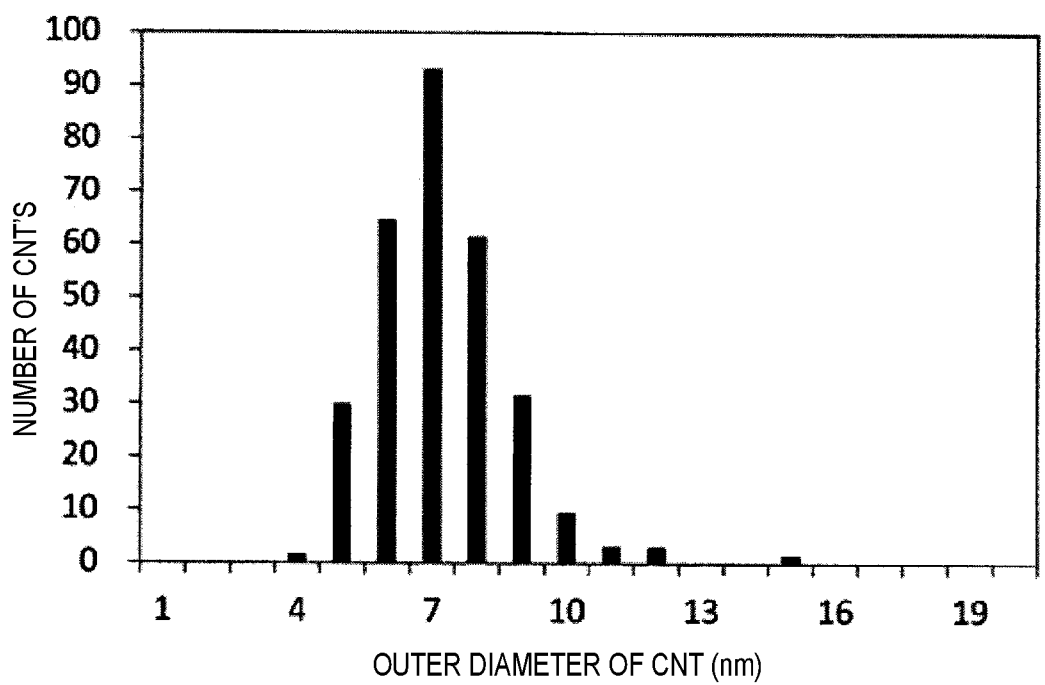
FIG. 6 is a graph showing a relationship between an outer diameter and the number of carbon nanotubes used in Example 6 when 300 arbitrary carbon nanotubes were observed using a transmission electron microscope.
Figure 7:
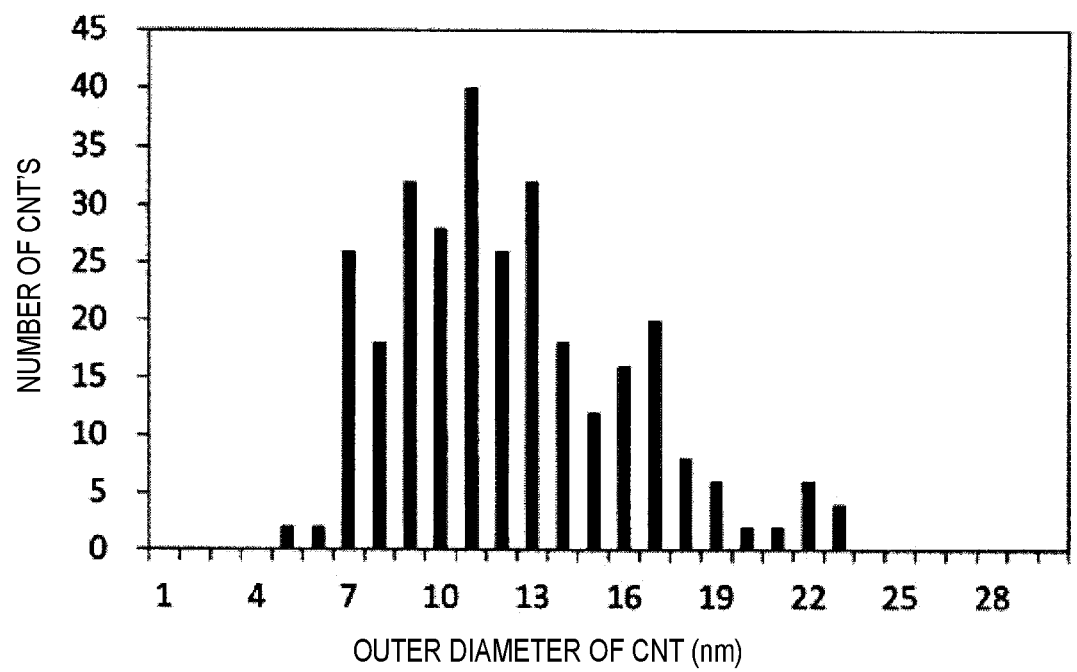
FIG. 7 is a graph showing a relationship between an outer diameter and the number of carbon nanotubes used in Comparative Example 1 when 300 arbitrary carbon nanotubes were observed using a transmission electron microscope.
Figure 8:
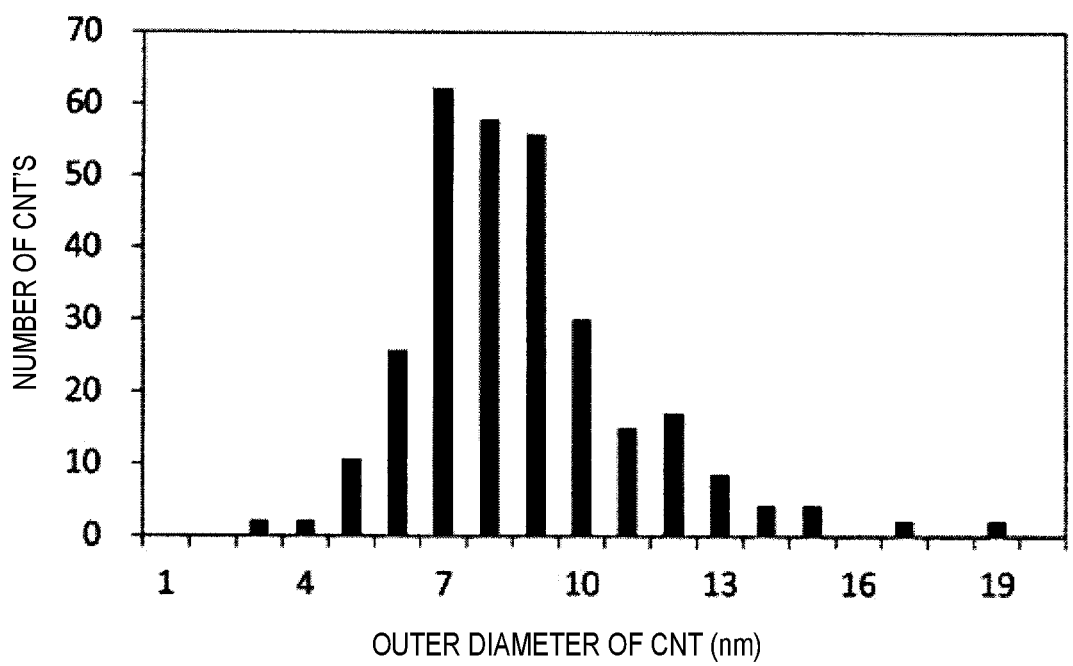
FIG. 8 is a graph showing a relationship between an outer diameter and the number of carbon nanotubes used in Comparative Example 2 when 300 arbitrary carbon nanotubes were observed using a transmission electron microscope.
Figure 9:
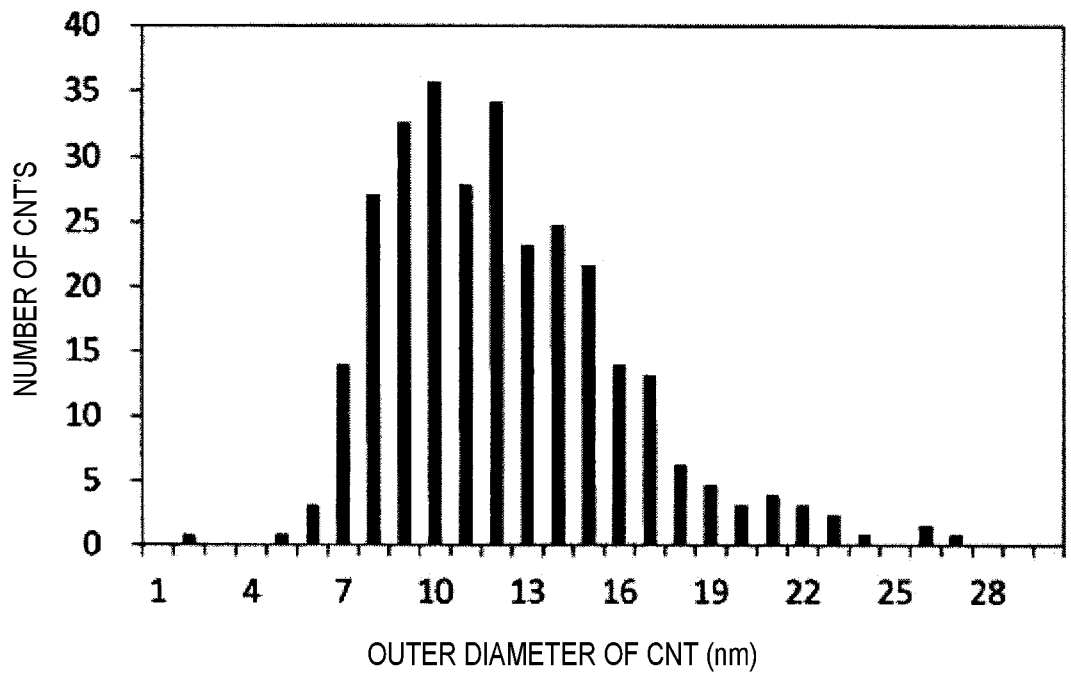
FIG. 9 is a graph showing a relationship between an outer diameter and the number of carbon nanotubes used in Comparative Example 3 when 300 arbitrary carbon nanotubes were observed using a transmission electron microscope.
Figure 10:
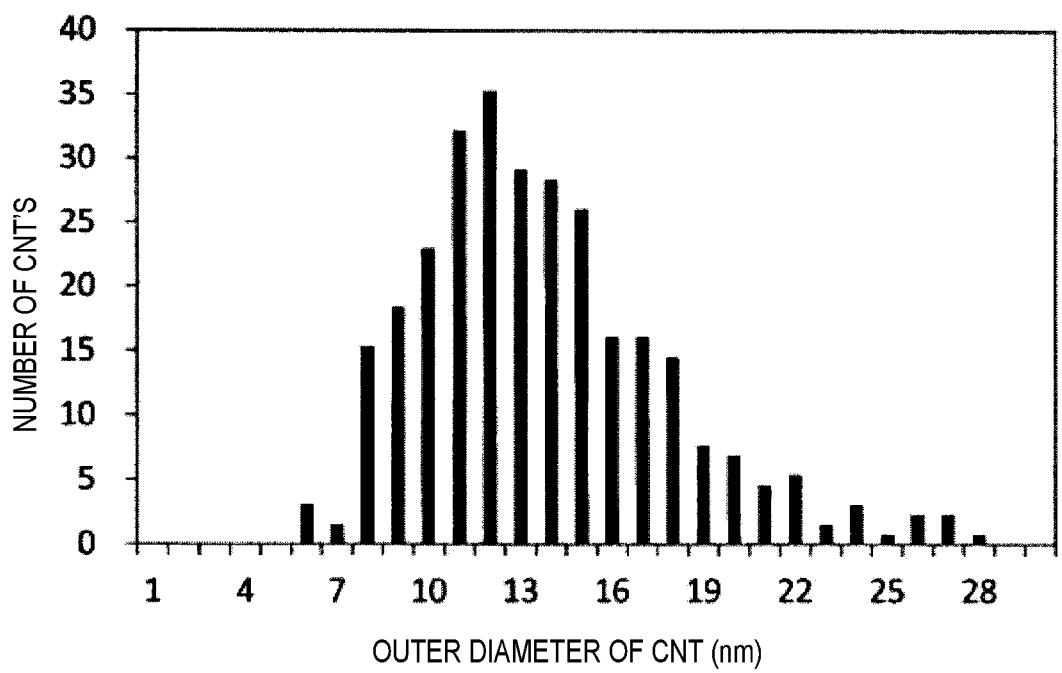
FIG. 10 is a graph showing a relationship between an outer diameter and the number of carbon nanotubes used in Comparative Example 4 when 300 arbitrary carbon nanotubes were observed using a transmission electron microscope.

CNT dispersions (F) and (G) were produced by the same method except that CNTs were changed to CNTs shown in Table 1. An average outer diameter of the CNTs and a standard deviation of an outer diameter of the CNTs were calculated based on graphs shown in FIGS. 1 to 10.

TABLE 1

|  | CNT | Outer diameter of CNT (nm) | Standard deviation of outer diameter (σ) | Half value width (°) | G/D ratio | purity CNT (%) | Volume resistivity of CNT ($\times 10^{-2}$ $\Omega \cdot cm$) | CNT dispersion | Concentration of CNT in CNT dispersion (%) |
|---|---|---|---|---|---|---|---|---|---|
| Example 1 | A | 9.9 | 3.36 | 3.04 | 0.85 | 96.5 | 1.85 | A | 3 |
| Example 2 | B | 8.6 | 2.96 | 4.26 | 0.71 | 95 | 1.91 | B | 3 |
| Example 3 | C | 7.5 | 1.60 | 5.28 | 0.71 | 96 | 1.81 | C | 3 |
| Example 4 | D | 6.7 | 1.70 | 5.22 | 0.68 | 95 | 1.75 | D | 3 |
| Example 5 | E (JENO TUBE 8S manufactured by JEIO Co., Ltd.) | 6.8 | 1.68 | 4.46 | 0.83 | 96 | 1.51 | E | 1.5 |
| Example 6 | F | 6.7 | 1.49 | 5.84 | 1.28 | 99.9 | 1.48 | F | 1.5 |
| Example 7 | G | 8.2 | 2.61 | 4.3 | 2.85 | 99.9 | 1.85 | G | 1.5 |
| Comparative Example 1 | FloTube 9000 manufactured by Cnano Technology Ltd. | 11.8 | 3.72 | 2.4 | 0.87 | 97.5 | 2.01 | H | 3 |
| Comparative Example 2 | FloTube 7010 manufactured by Cnano Technology Ltd. | 8.3 | 2.65 | 2.84 | 1.46 | 99.9 | 2.51 | I | 3 |
| Comparative Example 3 | NC 7000 manufactured by Nanocyl S.A. | 11.8 | 3.87 | 2.68 | 0.91 | 90 | 1.72 | J | 3 |
| Comparative Example 4 | 100P manufactured by Kumho Petrochemical Co., Ltd. | 13.7 | 4.23 | 2.58 | 0.96 | 97 | 1.63 | K | 3 |

<Synthesis of CNT (H)>

A CNT (H) was produced by the same method as in Example 9 of Japanese Patent Laid-Open No. 2015-123410 except that the catalyst (D) for CNT synthesis was used.

Example 1

3.9 parts of the CNT (A), 1.95 parts of a dispersant (polyvinylpyrrolidone K-30 manufactured by NIPPON SHOKUBAI CO., LTD.), 124 parts of NMP, and 200 parts of zirconia beads (bead diameter 1.25 mmφ) were put in a glass bottle (M-225, manufactured by Hakuyo Glass Co., Ltd.). After performing a dispersion treatment for 10 hours Example 8

4.7 parts by mass of NMP in which 8 mass % of PVDF (Solef #5130 manufactured by Solvay) was dissolved was weighed out into and put into a plastic container having a capacity of 150 cm³. Thereafter, 0.5 parts by mass of the CNT dispersion (A) was added, and the mixture was stirred at 2,000 rpm for 30 seconds using a rotation-revolution mixer (THINKY MIXER manufactured by Thinky Corporation, ARE-310). Furthermore, 5.7 parts by mass of the CNT dispersion (A) was added, the mixture was stirred again at 2,000 rpm for 30 seconds using the rotation-revolution mixer (THINKY MIXER, ARE-310), and thereby a carbon nanotube resin composition (A) was produced. Thereafter, 36.9 parts by mass of a positive electrode active material (HED (registered trademark) NCM-111 1100 manufactured by BASF TODA Battery Materials LLC) was added, and the mixture was stirred at 2,000 rpm for 2.5 minutes using the rotation-revolution mixer (THINKY MIXER, ARE-310). Finally, 2.2 parts by mass of NMP was added, the mixture was stirred at 2,000 rpm for 2.5 minutes using the rotation-revolution mixer (THINKY MIXER, ARE-310), and thereby a composite material slurry (A) was produced.

(Examples 9 to 11) and (Comparative Examples 5 to 8)

A carbon nanotube resin composition and a composite material slurry were produced by the same method as in Example 8 except that the CNT dispersion was changed to a CNT dispersion shown in Table 2.

TABLE 2

| | Composite material slurry | CNT dispersion | Carbon nanotube resin composition | Proportions of active material, CNT, and PVDF in composite material slurry (wt. %) |
|---|---|---|---|---|
| Example 8 | Composite material slurry (A) | CNT dispersion (A) | Carbon nanotube resin composition (A) | Active material/CNT/PVDF = 98.5/0.5/1 |
| Example 9 | Composite material slurry (B) | CNT dispersion (B) | Carbon nanotube resin composition (B) | Active material/CNT/PVDF = 98.5/0.5/1 |
| Example 10 | Composite material slurry (C) | CNT dispersion (C) | Carbon nanotube resin composition (C) | Active material/CNT/PVDF = 98.5/0.5/1 |
| Example 11 | Composite material slurry (D) | CNT dispersion (D) | Carbon nanotube resin composition (D) | Active material/CNT/PVDF = 98.5/0.5/1 |
| Comparative Example 5 | Composite material slurry (H) | CNT dispersion (H) | Carbon nanotube resin composition (H) | Active material/CNT/PVDF = 98.5/0.5/1 |
| Comparative Example 6 | Composite material slurry (I) | CNT dispersion (I) | Carbon nanotube resin composition (I) | Active material/CNT/PVDF = 98.5/0.5/1 |
| Comparative Example 7 | Composite material slurry (J) | CNT dispersion (J) | Carbon nanotube resin composition (J) | Active material/CNT/PVDF = 98.5/0.5/1 |
| Comparative Example 8 | Composite material slurry (K) | CNT dispersion (K) | Carbon nanotube resin composition (K) | Active material/CNT/PVDF = 98.5/0.5/1 |

Example 12

4.3 parts by mass of NMP in which 8 mass % of PVDF (Solef #5130 manufactured by Solvay) was dissolved was weighed out into and put into a plastic container having a capacity of 150 cm$^3$. Thereafter, 0.5 parts by mass of the CNT dispersion (E) was added, and the mixture was stirred at 2,000 rpm for 30 seconds using a rotation-revolution mixer (THINKY MIXER, ARE-310). Furthermore, 11.1 parts by mass of the CNT dispersion (E) was added, the mixture was stirred again at 2,000 rpm for 30 seconds using the rotation-revolution mixer (THINKY MIXER, ARE-310), and thereby a carbon nanotube resin composition (E) was produced. Thereafter, 34.1 parts by mass of a positive electrode active material (HED (registered trademark) NCM-111 1100 manufactured by BASF TODA Battery Materials LLC) was added, and the mixture was stirred at 2,000 rpm for 2.5 minutes using the rotation-revolution mixer (THINKY MIXER, ARE-310). Finally, the mixture was stirred at 2,000 rpm for 2.5 minutes using the rotation-revolution mixer (THINKY MIXER, ARE-310), and thereby a composite material slurry (E) was produced.

Examples 13 and 14

Carbon nanotube resin compositions (F) and (G) and composite material slurries (F) and (G) were produced in the same manner as in Example 12 except that the CNT dispersion (E) was changed to the CNT dispersions (F) and (G).

Example 15

4.3 parts by mass of NMP in which 8 mass % of PVDF (Solef #5130 manufactured by Solvay) was dissolved was weighed out into and put into a plastic container having a capacity of 150 cm$^3$. Thereafter, 0.5 parts by mass of the CNT dispersion (E) was added, and the mixture was stirred at 2,000 rpm for 30 seconds using a rotation-revolution mixer (THINKY MIXER, ARE-310). Furthermore, 8.7 parts by mass of the CNT dispersion (E) was added, the mixture was stirred again at 2,000 rpm for 30 seconds using the rotation-revolution mixer (THINKY MIXER, ARE-310), and thereby a carbon nanotube resin composition (L) was produced. Thereafter, 34.2 parts by mass of a positive electrode active material (HED (registered trademark) NCM-111 1100 manufactured by BASF TODA Battery Materials LLC) was added, and the mixture was stirred at 2,000 rpm for 2.5 minutes using the rotation-revolution mixer (THINKY MIXER, ARE-310). Finally, 2.3 parts by mass of NMP was added, the mixture was stirred at 2,000 rpm for 2.5 minutes using the rotation-revolution mixer (THINKY MIXER, ARE-310), and thereby a composite material slurry (L) was produced.

Examples 16 and 17

Carbon nanotube resin compositions (M) and (N) and composite material slurries (M) and (N) were produced in the same manner as in Example 15 except that the CNT dispersion (E) was changed to the CNT dispersions (F) and (G).

Table 3 shows the carbon nanotube resin compositions and the composite material slurries produced in Examples 12 to 17.

TABLE 3

| | Composite material slurry | CNT dispersion | Carbon nanotube resin composition | Proportions of active material, CNT, and PVDF in composite material slurry (wt. %) |
|---|---|---|---|---|
| Example 12 | Composite material slurry (E) | CNT dispersion (E) | Carbon nanotube resin composition (E) | Active material/CNT/PVDF = 98.5/0.5/1 |
| Example 13 | Composite material slurry (F) | CNT dispersion (F) | Carbon nanotube resin composition (F) | Active material/CNT/PVDF = 98.5/0.5/1 |

TABLE 3-continued

| | Composite material slurry | CNT dispersion | Carbon nanotube resin composition | Proportions of active material, CNT, and PVDF in composite material slurry (wt. %) |
|---|---|---|---|---|
| Example 14 | Composite material slurry (G) | CNT dispersion (G) | Carbon nanotube resin composition (G) | Active material/CNT/PVDF = 98.5/0.5/1 |
| Example 15 | Composite material slurry (L) | CNT dispersion (E) | Carbon nanotube resin composition (L) | Active material/CNT/PVDF = 98.6/0.4/1 |
| Example 16 | Composite material slurry (M) | CNT dispersion (F) | Carbon nanotube resin composition (M) | Active material/CNT/PVDF = 98.6/0.4/1 |
| Example 17 | Composite material slurry (N) | CNT dispersion (G) | Carbon nanotube resin composition (N) | Active material/CNT/PVDF = 98.6/0.4/1 |

Example 18

The composite material slurry (A) was applied onto an aluminum foil using an applicator such that a thickness was 70±10 μm, and then the coated film was dried at 120° C.±5° C. for 25 minutes in an electric oven. Thereby, an electrode membrane (A) was produced.

(Examples 19 to 27) and (Comparative Examples 9 to 12)

Electrode membranes (B) to (N) were produced by the same method as in Example 18 except that the composite material slurries were changed to composite material slurries shown in Table 4.

TABLE 4

| | Composite material slurry | Proportions of active material, CNT, and PVDF in composite material slurry (wt. %) | Electrode membrane |
|---|---|---|---|
| Example 18 | Composite material slurry (A) | Active material/CNT/PVDF = 98.5/0.5/1 | Electrode membrane (A) |
| Example 19 | Composite material slurry (B) | Active material/CNT/PVDF = 98.5/0.5/1 | Electrode membrane (B) |
| Example 20 | Composite material slurry (C) | Active material/CNT/PVDF = 98.5/0.5/1 | Electrode membrane (C) |
| Example 21 | Composite material slurry (D) | Active material/CNT/PVDF = 98.5/0.5/1 | Electrode membrane (D) |
| Example 22 | Composite material slurry (E) | Active material/CNT/PVDF = 98.5/0.5/1 | Electrode membrane (E) |
| Example 23 | Composite material slurry (F) | Active material/CNT/PVDF = 98.5/0.5/1 | Electrode membrane (F) |
| Example 24 | Composite material slurry (G) | Active material/CNT/PVDF = 98.5/0.5/1 | Electrode membrane (G) |
| Example 25 | Composite material slurry (L) | Active material/CNT/PVDF = 98.6/0.4/1 | Electrode membrane (L) |
| Example 26 | Composite material slurry (M) | Active material/CNT/PVDF = 98.6/0.4/1 | Electrode membrane (M) |
| Example 27 | Composite material slurry (N) | Active material/CNT/PVDF = 98.6/0.4/1 | Electrode membrane (N) |
| Comparative Example 9 | Composite material slurry (H) | Active material/CNT/PVDF = 98.5/0.5/1 | Electrode membrane (H) |
| Comparative Example 10 | Composite material slurry (I) | Active material/CNT/PVDF = 98.5/0.5/1 | Electrode membrane (I) |
| Comparative Example 11 | Composite material slurry (J) | Active material/CNT/PVDF = 98.5/0.5/1 | Electrode membrane (J) |
| Comparative Example 12 | Composite material slurry (K) | Active material/CNT/PVDF = 98.5/0.5/1 | Electrode membrane (K) |

Table 5 shows evaluation results of the electrode membranes produced in Examples 18 to 27 and Comparative Examples 9 to 12. The evaluation criteria are as follows. Electrical conductivity evaluation was as follows: +++ (excellent): an electrode membrane having a volume resistivity (Ω·cm) of less than 6; ++ (favorable): an electrode membrane having a volume resistivity (Ω·cm) of equal to or more than 6 and less than 8; ±(usable): an electrode membrane having a volume resistivity (Ω·cm) of equal to or more than 8 and less than 10; and − (unusable): an electrode membrane having a volume resistivity (Ω·cm) of more than 10. Adhesiveness evaluation was as follows: +++ (excellent): peeling strength (N/cm) of equal to or more than 0.4; ++ (favorable): peeling strength (N/cm) of equal to or more than 0.2 and less than 0.4; + (usable): peeling strength (N/cm) of equal to or more than 0.1 and less than 0.2; and − (unusable): peeling strength (N/cm) of less than 0.1. Comprehensive evaluation was as follows: A (excellent): a case in which a sum of the numbers of + in the electrical conductivity evaluation and the adhesiveness evaluation was equal to or more than 4, and − was not included; B (favorable): a case in which a sum of the numbers of + in the electrical conductivity evaluation and the adhesiveness evaluation was equal to or more than 2, and − was not included; and C (unusable): a case in which − was included in the electrical conductivity evaluation or the adhesiveness evaluation.

TABLE 5

| | Composite material slurry | Electrode membrane | Volume resistivity of electrode membrane (Ω · cm) | Peeling strength (N/cm) | Electrical conductivity evaluation | Adhesiveness evaluation | Comprehensive evaluation |
|---|---|---|---|---|---|---|---|
| Example 18 | Composite material slurry (A) | Electrode membrane (A) | 8.2 | 0.37 | + | ++ | B |
| Example 19 | Composite material slurry (B) | Electrode membrane (B) | 8.8 | 0.30 | + | ++ | B |
| Example 20 | Composite material slurry (C) | Electrode membrane (C) | 7.5 | 0.26 | ++ | ++ | A |
| Example 21 | Composite material slurry (D) | Electrode membrane (D) | 7.2 | 0.25 | ++ | ++ | A |
| Example 22 | Composite material slurry (E) | Electrode membrane (E) | 5.9 | 0.10 | +++ | + | A |
| Example 23 | Composite material slurry (F) | Electrode membrane (F) | 4.2 | 0.20 | +++ | ++ | A |

TABLE 5-continued

|  | Composite material slurry | Electrode membrane | Volume resistivity of electrode membrane (Ω·cm) | Peeling strength (N/cm) | Electrical conductivity evaluation | Adhesiveness evaluation | Comprehensive evaluation |
|---|---|---|---|---|---|---|---|
| Example 24 | Composite material slurry (G) | Electrode membrane (G) | 5.5 | 0.24 | +++ | ++ | A |
| Example 25 | Composite material slurry (L) | Electrode membrane (L) | 8.6 | 0.10 | + | + | B |
| Example 26 | Composite material slurry (M) | Electrode membrane (M) | 6.2 | 0.31 | ++ | ++ | A |
| Example 27 | Composite material slurry (N) | Electrode membrane (N) | 7.9 | 0.37 | ++ | ++ | A |
| Comparative Example 9 | Composite material slurry (H) | Electrode membrane (H) | 132.1 | 0.66 | − | +++ | C |
| Comparative Example 10 | Composite material slurry (I) | Electrode membrane (I) | 20.1 | 0.41 | − | +++ | C |
| Comparative Example 11 | Composite material slurry (J) | Electrode membrane (J) | 17.7 | 0.13 | − | + | C |
| Comparative Example 12 | Composite material slurry (K) | Electrode membrane (K) | 11.1 | 0.39 | − | ++ | C |

Example 28

1.95 parts of the CNT (E), 0.98 parts of a dispersant (polyvinylpyrrolidone K-30 manufactured by NIPPON SHOKUBAI CO., LTD.), 127 parts of ion exchange water, and 200 parts of zirconia beads (bead diameter 1.25 mmφ) were put in a glass bottle (M-225, manufactured by Hakuyo Glass Co., Ltd.). After performing a dispersion treatment for 10 hours using a paint conditioner manufactured by Red Devil, the zirconia beads were separated off to produce a CNT dispersion (WA).

7.4 parts by mass of an aqueous solution of 2 mass % of carboxymethyl cellulose with a degree of etherification of 0.45 to 0.55 as a thickener (CELLOGEN PL-15, manufactured by DKS Co., Ltd.), and 0.9 parts by mass of a solution of 40 mass % of an SBR emulsion as a binder (manufactured by Zeon Corporation, product name: BM-400B) were weighed out into and put into a plastic container with a capacity of 150 cm$^3$. Thereafter, 0.5 parts by mass of the CNT dispersion (WA) was added, and the mixture was stirred at 2,000 rpm for 30 seconds using a rotation-revolution mixer (THINKY MIXER manufactured by Thinky Corporation, ARE-310). Furthermore, 11.5 parts by mass of the CNT dispersion (WA) was added, the mixture was stirred again at 2,000 rpm for 30 seconds using the rotation-revolution mixer (THINKY MIXER, ARE-310), and thereby a carbon nanotube resin composition (WA) was produced. Thereafter, 35.5 parts by mass of a positive electrode active material (LiFePO$_4$ having a carbon coating amount of 5 mass %) was further added, and the mixture was stirred at 2,000 rpm for 2.5 minutes using the rotation-revolution mixer (THINKY MIXER, ARE-310). Finally, the mixture was stirred at 2,000 rpm for 2.5 minutes using the rotation-revolution mixer (THINKY MIXER, ARE-310), and thereby a composite material slurry (WA) was produced.

The composite material slurry (WA) was applied onto an aluminum foil using an applicator such that a thickness was 70±10 μm, and then the coated film was dried at 120° C.±5° C. for 25 minutes in an electric oven. Thereby, an electrode membrane (WA) was produced.

Table 6 shows evaluation results of the electrode membrane produced in Example 28. The evaluation criteria are as follows. Electrical conductivity evaluation was as follows: +++ (excellent): an electrode membrane having a volume resistivity (Ω·cm) of less than 6; ++ (favorable): an electrode membrane having a volume resistivity (Ω·cm) of equal to or more than 6 and less than 8; + (usable): an electrode membrane having a volume resistivity (Ω·cm) of equal to or more than 8 and less than 10; and − (unusable): an electrode membrane having a volume resistivity (Ω·cm) of more than 10. Adhesiveness evaluation was as follows: +++ excellent): peeling strength (N/cm) of equal to or more than 0.4; ++ favorable): peeling strength (N/cm) of equal to or more than 0.2 and less than 0.4; + usable): peeling strength (N/cm) of equal to or more than 0.1 and less than 0.2; and − (unusable): peeling strength (N/cm) of less than 0.1. Comprehensive evaluation was as follows: A (excellent): a case in which a sum of the numbers of + in the electrical conductivity evaluation and the adhesiveness evaluation was equal to or more than 4, and − was not included; B (favorable): a case in which a sum of the numbers of + in the electrical conductivity evaluation and the adhesiveness evaluation was equal to or more than 2, and − was not included; and C (unusable): a case in which − was included in the electrical conductivity evaluation or the adhesiveness evaluation.

TABLE 6

|  | Composite material slurry | Electrode membrane | Volume resistivity of electrode membrane (Ω·cm) | Peeling strength (N/cm) | Electrical conductivity evaluation | Adhesiveness evaluation | Comprehensive evaluation |
|---|---|---|---|---|---|---|---|
| Example 28 | Composite material slurry (WA) | membrane Electrode (WA) | 9.5 | 0.35 | + | ++ | B |

Table 7 shows evaluation results of the CNT dispersions, the composite material slurries, and the electrode membranes produced by using the CNTs used in Examples 1 to 7 and 28 and Comparative Examples 1 to 4. Comprehensive evaluation was the same as the comprehensive evaluation of the electrode membranes.

TABLE 7

| | CNT | Outer diameter of CNT (nm) | Standard deviation of outer diameter ($\sigma$) | Half value width (°) | G/D ratio | Volume resistivity of CNT ($\times 10^{-2}$ $\Omega \cdot cm$) | CNT dispersion | Composite material slurry | Electrode membrane | Comprehensive evaluation |
|---|---|---|---|---|---|---|---|---|---|---|
| Example 1 | A | 9.9 | 3.36 | 3.04 | 0.85 | 1.85 | CNT dispersion (A) | Composite material slurry (A) | Electrode membrane (A) | B |
| Example 2 | B | 8.6 | 2.96 | 4.26 | 0.71 | 1.91 | CNT dispersion (B) | Composite material slurry (B) | Electrode membrane (B) | B |
| Example 3 | C | 7.5 | 1.60 | 5.28 | 0.71 | 1.81 | CNT dispersion (C) | Composite material slurry (C) | Electrode membrane (C) | A |
| Example 4 | D | 6.7 | 1.70 | 5.22 | 0.68 | 1.75 | CNT dispersion (D) | Composite material slurry (D) | Electrode membrane (D) | A |
| Example 5 | E (JENO TUBE 8S manufactured by JEIO Co., Ltd.) | 6.8 | 1.68 | 4.46 | 0.83 | 1.51 | CNT dispersion (E) | Composite material slurry (E) | Electrode membrane (E) | A |
| Example 6 | F | 6.7 | 1.49 | 5.84 | 1.28 | 1.48 | CNT dispersion (F) | Composite material slurry (F) | Electrode membrane (F) | A |
| Example 7 | G | 8.2 | 2.61 | 4.3 | 2.85 | 2.25 | CNT dispersion (G) | Composite material slurry (G) | Electrode membrane (G) | A |
| Example 28 | A | 9.9 | 3.36 | 3.04 | 0.85 | 1.85 | CNT dispersion (WA) | Composite material slurry (WA) | Electrode membrane (WA) | B |
| Comparative Example 1 | FloTube 9000 manufactured by Cnano Technology Ltd. | 11.8 | 3.72 | 2.4 | 0.87 | 2.01 | CNT dispersion (H) | Composite material slurry (H) | Electrode membrane (H) | C |
| Comparative Example 2 | FloTube 7010 manufactured by Cnano Technology Ltd. | 8.3 | 2.65 | 2.84 | 1.46 | 2.51 | CNT dispersion (I) | Composite material slurry (I) | Electrode membrane (I) | C |
| Comparative Example 3 | NC 7000 manufactured by Nanocyl S.A. | 11.8 | 3.87 | 2.68 | 0.91 | 1.72 | CNT dispersion (J) | Composite material slurry (J) | Electrode membrane (J) | C |
| Comparative Example 4 | 100P manufactured by Kumho Petrochemical Co., Ltd. | 13.7 | 4.23 | 2.58 | 0.96 | 1.63 | CNT dispersion (K) | Composite material slurry (K) | Electrode membrane (K) | C |

In the above examples, the CNTs having an average outer diameter of more than 3 nm and less than 10 nm and a half value width of 3° to 6° were used. In the comparative examples, the CNTs having a half value width of less than 3° were used. It was found that the electrode membranes of the examples had higher electrical conductivity than the electrode membranes of the comparative examples. Since the electrode membranes having high electrical conductivity could be produced even with a small amount of addition of the CNT dispersion, it became clear that the embodiment of the present invention can provide an electrode membrane having an electrical conductivity which cannot be realized by conventional CNT dispersions.

Although the invention of the present application has been described above with reference to the embodiments, the invention of the present application is not limited to the above descriptions. Various changes that can be understood by those skilled in the art can be made within the scope of the invention in the configuration and details of the invention of the present application.

What is claimed is:

1. A carbon nanotube dispersion, comprising:
   a carbon nanotube;
   a solvent; and
   a dispersant,
   wherein the carbon nanotube satisfies the following (1), (2), and (3):
   (1) an average outer diameter is more than 3 nm and less than 10 nm,
   (2) a peak appears at a diffraction angle $2\theta=25°\pm2°$ in powder X-ray diffraction analysis, and a half value width of the peak is 3° to 6°, and
   (3) a G/D ratio is 0.5 to 4.5, where G represents a maximum peak intensity in a range of 1,560 to 1,600 $cm^{-1}$, and D represents a maximum peak intensity in a range of 1,310 to 1,350 $cm^{-1}$ in a Raman spectrum.

2. The carbon nanotube dispersion according to claim 1, wherein a standard deviation of an outer diameter of the carbon nanotube is more than 0.7 nm and equal to or less than 3.5 nm.

3. The carbon nanotube dispersion according to claim 2, wherein a volume resistivity of the carbon nanotube is $1.0\times10^{-2}$ to $2.5\times10^{-2}$ $\Omega\cdot cm$.

4. The carbon nanotube dispersion according to claim 3, wherein the G/D ratio is 1.0 to 3.0.

5. The carbon nanotube dispersion according to claim 2, wherein the G/D ratio is 1.0 to 3.0.

6. The carbon nanotube dispersion according to claim 2, wherein the solvent is an amide-based organic solvent or water.

7. The carbon nanotube dispersion according to claim 2, wherein $5.0 \text{ nm} \leq X \pm \sigma \leq 14.0 \text{ nm}$ is satisfied, where X represents the average outer diameter of the carbon nanotube, and $\sigma$ represents the standard deviation of the outer diameter of the carbon nanotube.

8. The carbon nanotube dispersion according to claim 1, wherein a volume resistivity of the carbon nanotube is $1.0 \times 10^{-2}$ to $2.5 \times 10^{-2}$ $\Omega \cdot$cm.

9. The carbon nanotube dispersion according to claim 8, wherein the G/D ratio is 1.0 to 3.0.

10. The carbon nanotube dispersion according to claim 8, wherein the solvent is an amide-based organic solvent or water.

11. The carbon nanotube dispersion according to claim 8, wherein $5.0 \text{ nm} \leq X \pm \sigma \leq 14.0 \text{ nm}$ is satisfied, where X represents the average outer diameter of the carbon nanotube, and $\sigma$ represents the standard deviation of the outer diameter of the carbon nanotube.

12. The carbon nanotube dispersion according to claim 1, wherein the G/D ratio is 1.0 to 3.0.

13. The carbon nanotube dispersion according to claim 12, wherein the solvent is an amide-based organic solvent or water.

14. The carbon nanotube dispersion according to claim 12, wherein $5.0 \text{ nm} \leq X \pm \sigma \leq 14.0 \text{ nm}$ is satisfied, where X represents the average outer diameter of the carbon nanotube, and $\sigma$ represents the standard deviation of the outer diameter of the carbon nanotube.

15. The carbon nanotube dispersion according to claim 1, wherein the solvent is an amide-based organic solvent or water.

16. The carbon nanotube dispersion according to claim 15, wherein $5.0 \text{ nm} \leq X \pm \sigma \leq 14.0 \text{ nm}$ is satisfied, where X represents the average outer diameter of the carbon nanotube, and $\sigma$ represents the standard deviation of the outer diameter of the carbon nanotube.

17. The carbon nanotube dispersion according to claim 1, wherein $5.0 \text{ nm} \leq X \pm \sigma \leq 14.0 \text{ nm}$ is satisfied, where X represents the average outer diameter of the carbon nanotube, and $\sigma$ represents the standard deviation of the outer diameter of the carbon nanotube.

18. A carbon nanotube resin composition, comprising:
   the carbon nanotube dispersion according to claim 1; and
   a binder.

19. A composite material slurry, comprising:
   the carbon nanotube resin composition according to claim 18; and
   an active material.

20. An electrode membrane which is coated with the composite material slurry according to claim 19.

* * * * *